United States Patent
Bhuiyan et al.

(10) Patent No.: US 12,047,377 B2
(45) Date of Patent: Jul. 23, 2024

(54) RESTRICTED OPERATIONS DUE TO ATTACHMENT OF COMPUTE INSTANCES OWNED BY DIFFERENT TENANCIES

(71) Applicant: Oracle International Corporation, Redwood Shores, CA (US)

(72) Inventors: A M Helali Mortuza Bhuiyan, Redmond, WA (US); Girish Nagaraja, Sammamish, WA (US); Jyotishman Nag, Chicago, IL (US); Sahitya Gollapudi, Newark, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 271 days.

(21) Appl. No.: 17/459,167

(22) Filed: Aug. 27, 2021

(65) Prior Publication Data
US 2023/0063458 A1    Mar. 2, 2023

(51) Int. Cl.
*H04L 9/40*    (2022.01)

(52) U.S. Cl.
CPC .................................. *H04L 63/10* (2013.01)

(58) Field of Classification Search
CPC ..... H04L 63/10; H04L 63/102; H04L 63/104; H04L 63/105; G06F 9/5038; G06F 9/5044
See application file for complete search history.

(56) References Cited

U.S. PATENT DOCUMENTS

| | | | |
|---|---|---|---|
| 9,043,445 B2 | 5/2015 | Deluca et al. | |
| 10,044,723 B1 | 8/2018 | Fischer et al. | |
| 10,063,415 B1 | 8/2018 | Kanakarajan | |
| 10,691,501 B1 | 6/2020 | Hussain et al. | |
| 10,819,650 B2 | 10/2020 | Halimi et al. | |
| 11,190,516 B1 * | 11/2021 | Loladia | H04L 63/0876 |
| 11,457,080 B1 | 9/2022 | Meduri et al. | |
| 11,880,791 B2 | 1/2024 | Bhuiyan et al. | |
| 2014/0075021 A1 | 3/2014 | Revanuru | |
| 2014/0075033 A1 | 3/2014 | Doering et al. | |
| 2014/0075035 A1 | 3/2014 | Revanuru et al. | |

(Continued)

FOREIGN PATENT DOCUMENTS

| | | |
|---|---|---|
| JP | 2022107461 A | 7/2022 |
| WO | 2014039772 A1 | 3/2014 |

(Continued)

OTHER PUBLICATIONS

Oracle University, Oracle Cloud Infrastructure Fundamentals, Sep. 2017, Student Guide D100804GC10, Edition 1.0, pp. 18, 21, 22, 24, 72 (Year: 2017).*

(Continued)

*Primary Examiner* — Carl G Colin
*Assistant Examiner* — Habibullah
(74) *Attorney, Agent, or Firm* — Kilpatrick Townsend & Stockton LLP

(57) ABSTRACT

Techniques are disclosed for restricting operations between two attached two compute instances. An infrastructure and a generalized method is described for attaching two or more cloud resources (e.g., two compute instances) in spite of the compute resources being provisioned by two different services from different cloud tenancies, and then modifying the allowed operations that can be performed due to the attachment.

20 Claims, 12 Drawing Sheets

(56) References Cited

U.S. PATENT DOCUMENTS

| | | | |
|---|---|---|---|
| 2014/0075565 A1 | 3/2014 | Srinivasan et al. | |
| 2015/0363221 A1 | 12/2015 | Terayama et al. | |
| 2017/0006119 A1* | 1/2017 | Pogrebinsky | G06F 3/0482 |
| 2017/0070892 A1 | 3/2017 | Song et al. | |
| 2018/0324256 A1 | 11/2018 | Helsen et al. | |
| 2019/0149592 A1 | 5/2019 | Lander et al. | |
| 2020/0133737 A1* | 4/2020 | Gunaratne | G06F 9/5077 |
| 2020/0344235 A1 | 10/2020 | Bhuiyan et al. | |
| 2021/0152631 A1 | 5/2021 | Ravindra et al. | |
| 2022/0311821 A1 | 9/2022 | Shah et al. | |
| 2023/0063458 A1 | 3/2023 | Bhuiyan et al. | |
| 2023/0069520 A1 | 3/2023 | Bhuiyan et al. | |

FOREIGN PATENT DOCUMENTS

| | | | | |
|---|---|---|---|---|
| WO | WO-2014039772 A1 * | 3/2014 | | G06F 16/122 |
| WO | 2021059352 A1 | 4/2021 | | |
| WO | 2021059353 A1 | 4/2021 | | |
| WO | 2021075055 A1 | 4/2021 | | |

OTHER PUBLICATIONS

Team Devclass, Microsoft and Oracle strike cloud alliance which could see ancient apps live forever, Jun. 6, 2019, Paragraphs: 1, 2, 3, 5 (Year: 2019).*

Ted Rohm, AI in ERP, Jan. 19, 2021, https://www3.technologyevaluation.com/research/article/how-ai-is-transforming-erp.html (Year: 2021).*

U.S. Appl. No. 17/459,162, Non-Final Office Action, Mailed on Feb. 9, 2023, 12 pages.

Application No. PCT/US2022/024481, International Search Report and Written Opinion, Mailed on Jun. 24, 2022, 13 pages.

U.S. Appl. No. 17/459,162, Notice of Allowance, Mailed on May 16, 2023, 11 pages.

U.S. Appl. No. 17/459,162, Applicant-Initiated Interview Summary mailed on Apr. 17, 2023, 4 pages.

U.S. Appl. No. 18/343,185, Non-Final Office Action mailed on Feb. 16, 2024, 10 pages.

International Application No. PCT/US2022/024481, International Preliminary Report on Patentability mailed on Mar. 7, 2024, 10 pages.

* cited by examiner

RESTRICTED OPERATIONS DUE TO ATTACHMENT OF COMPUTE INSTANCES OWNED BY DIFFERENT TENANCIES

RELATED APPLICATIONS

This application is related to U.S. Non-Provisional application Ser. No. 17/459,162 titled "Attachment And Detachment Of Compute Instances Owned By Different Tenancies" filed concurrently with the present application on Aug. 27, 2021. The entire contents of the afore-mentioned application are incorporated herein by reference for all purposes.

BACKGROUND

When a customer signs up as a subscriber for IaaS services provided by an IaaS Cloud Services Provider (CSP), an account or tenancy is created for the customer. In certain implementations, the tenancy that is created for the customer (also referred to as the customer tenancy) provides a root level compartment that holds all the cloud resources for the customer. In a typical scenario, a customer and its users only have access to resources that are placed within that customer's tenancy. These resources may include, for example, one or more compute instances provisioned for the customer to provide one or more services for the customer.

For a particular service subscribed to by the customer and for which a customer instance is provisioned for the customer, the compute instance is typically created and provided by a separate service infrastructure that is configured to provision and manage cloud resources related to the particular service. For example, if the customer subscribes to a Service A and a Service B, a Service A infrastructure associated with its own tenancy (referred to as a service tenancy) is configured to create and provision a compute instance A that provides Service A for the customer. Likewise, a Service B infrastructure associated with its own tenancy is configured to create and provision a compute instance B that provides Service B for the customer. The life cycle management of compute instance A is controlled exclusively by the Service A infrastructure and the life cycle management of compute instance B is controlled exclusively by the Service B infrastructure. Further, the compute instances created by the separate service infrastructures cannot directly talk to or interact with each other since they have been provisioned by infrastructures in two different tenancies. However, there may be situations where a customer may benefit from resources (e.g., compute instance A and compute instance B in the above example) received from two different service infrastructures to be able to interact with and work with each other but this is made difficult due to the isolation of the compute instance based upon their service tenancies.

The present disclosure describes solutions to the above-described problems.

BRIEF SUMMARY

The present disclosure relates generally to creating an attachment between compute instances. As described herein, an infrastructure and a generalized method is described for attaching (also referred to as "wiring") two (or more) cloud resources (e.g., two compute instances) in spite of the compute resources being provisioned by two different services from different cloud tenancies. An automated process is described that is executed for wiring the compute instances. The automated process can be generally applied to attach any two compute instances providing two different services and provisioned from two different service tenancies.

For example, a customer may send a request to a first service infrastructure to attach a first service compute instance and a second service compute instance. The request may be received and processed by a first service control plane of the first service infrastructure. A workflow is then executed for attaching the two compute instances, wherein the workflow involves processing performed by the first service control plane, a second service control plane, and by an identity management and authorization service (IDMAS).

In certain embodiments, a method comprises receiving, by a first control plane for a first service, a request to perform an operation at a second compute instance of a second service, wherein there is an attachment between a first compute instance of the first service and the second compute instance of the second service, the first compute instance is a dominant compute instance, and the second compute instance is a passive compute instance, the first compute instance is controlled by the first control plane, the second compute instance is controlled by the first control plane due to the attachment, the first compute instance is within a customer tenancy, and the second compute instance is within the customer tenancy; determining, by the first control plane, whether the operation is authorized based on one or more sets of allowed operations associated with one or more compartments; and in response to determining, denying, by the first control plane, the request to perform the operation at the second compute instance.

In yet another embodiment, wherein determining whether the operation is authorized based on one or more sets of allowed operations associated with one or more compartments includes: analyzing, by the first control plane, a first set of allowed operations associated with a first compartment of the customer tenancy, wherein the second compute instance of the second service is located at the first compartment of the customer tenancy; and determining, by the first control plane, that the operation is authorized based on the first set of allowed operations associated with the first compartment of the customer tenancy.

In yet another embodiment, wherein determining whether the operation is authorized based on one or more sets of allowed operations associated with one or more compartments includes: in response to determining that the operation is authorized based on the first set of allowed operations associated with the first compartment of the customer tenancy, determining, by the first control plane, that the attachment exists between the first compute instance of the first service and the second compute instance of the second service.

In yet another embodiment, wherein determining whether the operation is authorized based on one or more sets of allowed operations associated with one or more compartments includes: in response to determining that the attachment exists, determining, by the first control plane, that the operation is restricted.

In yet another embodiment, wherein determining whether the operation is authorized based on one or more sets of allowed operations associated with one or more compartments includes: in response to determining that the operation is restricted, analyzing, by the first control plane, a second set of allowed operations associated with an owner compartment of the first control plane; and determining, by the first control plane, that the operation is not authorized based on the second set of allowed operations associated with the owner compartment of the first control plane.

In yet another embodiment, wherein the first control plane is a dominant control plane, the second compute instance is associated with a second control plane that is a passive control plane.

In yet another embodiment, wherein the first service is an Enterprise Resource Planning (ERP) service, and the second service is a conversational Artificial Intelligence (AI) service.

The foregoing, together with other features and embodiments will become more apparent upon referring to the following specification, claims, and accompanying drawings.

DETAILED DESCRIPTION

Figure 1:
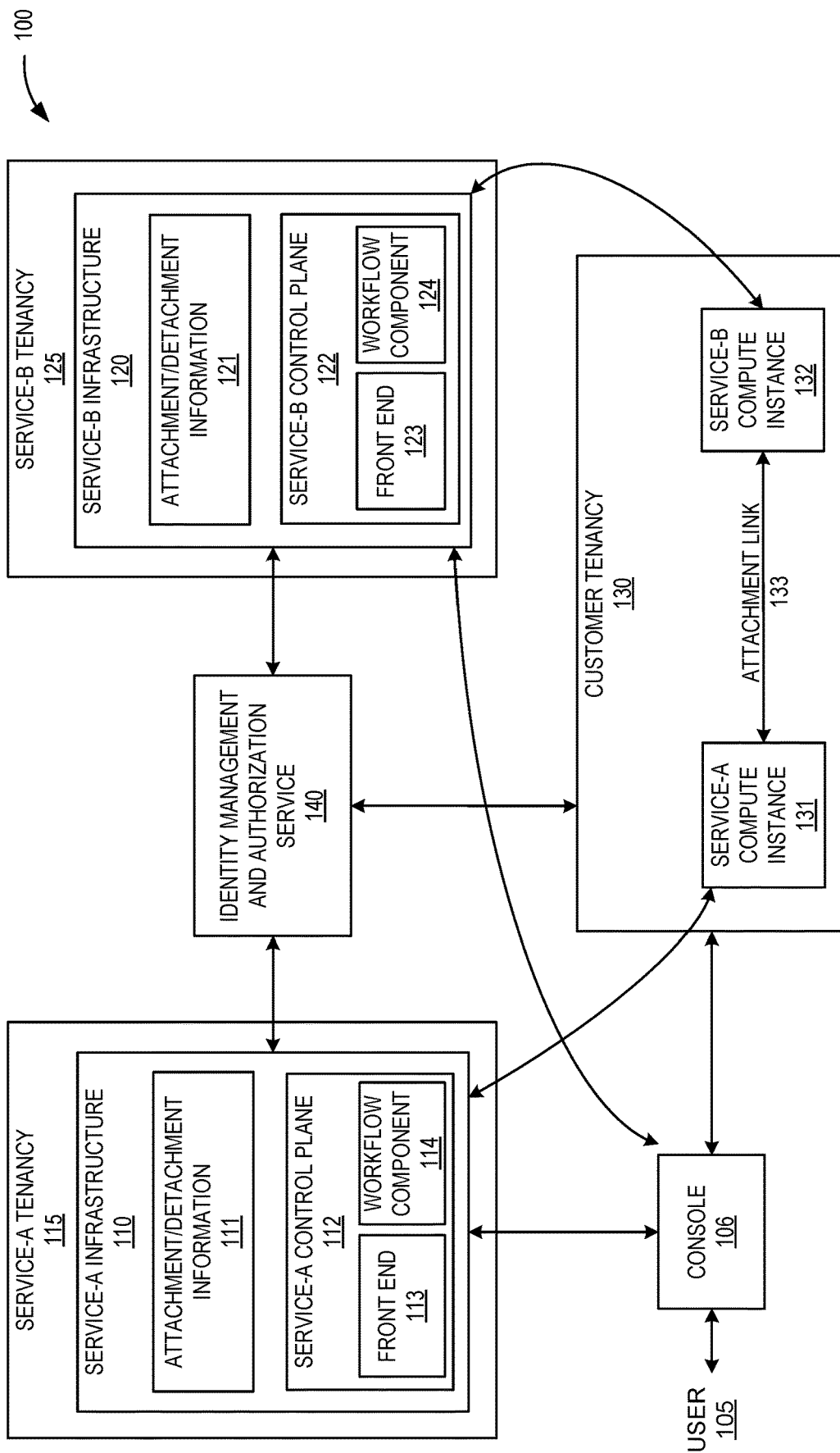
FIG. 1 is a simplified block diagram of a distributed environment according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to creating an attachment between compute instances. When a customer signs up as a subscriber for IaaS services provided by an IaaS Cloud Services Provider (CSP), an account or tenancy is created for the customer. In certain implementations, the tenancy that is created for the customer (also referred to as the customer tenancy) provides a root level compartment that holds all the cloud resources for the customer. In a typical scenario, a customer and its users only have access to resources that are placed within that customer's tenancy. These resources may include, for example, one or more compute instances provisioned for the customer to provide one or more services for the customer.

For a particular service subscribed to by the customer and for which a customer instance is provisioned for the customer, the compute instance is typically created and provided by a separate service infrastructure that is configured to provision and manage cloud resources related to the particular service. For example, if the customer subscribes to a Service A and a Service B, a Service A infrastructure associated with its own tenancy (referred to as a service tenancy) is configured to create and provision a compute instance A that provides Service A for the customer. Likewise, a Service B infrastructure associated with its own tenancy is configured to create and provision a compute instance B that provides Service B for the customer. The life cycle management of compute instance A is controlled exclusively by the Service A infrastructure and the life cycle management of compute instance B is controlled exclusively by the Service B infrastructure. Further, the compute instances created by the separate service infrastructures cannot directly talk to or interact with each other since they have been provisioned by infrastructures in two different tenancies. However, there may be situations where a customer may benefit from resources (e.g., compute instance A and compute instance B in the above example) received from two different service infrastructures to be able to interact with and work with each other but this is made difficult due to the isolation of the compute instance based upon their service tenancies.

In this sense, the customer may wish to "attach" the two compute instances to enable such cooperative functioning of the compute instances. In the past, such an attachment could be achieved only by making customized changes to the code implementing the two compute instances to be attached. Such as solution is however specific to only those compute instances and cannot generally be applied to other cloud resources to be attached. Further, because of the specific code changes that have to be applied to the two compute instances to be attached, the process takes a long time, is specific to only those compute instances, and cannot be applied to other types of compute instances. As a result, such an attachment could not be requested by a customer on-demand.

The present disclosure describes solutions to the above-described problems. As described herein, an infrastructure and a generalized method is described for attaching (also referred to as "wiring") two (or more) cloud resources (e.g., two compute instances) in spite of the compute resources being provisioned by two different services from different cloud tenancies. An automated process is described that is executed for wiring the compute instances. The automated process can be generally applied to attach any two compute instances providing two different services and provisioned from two different service tenancies.

For example, a customer may send a request to a first service infrastructure to attach a first service compute instance and a second service compute instance. The request may be received and processed by a first service control plane of the first service infrastructure. A workflow is then executed for attaching the two compute instances, wherein the workflow involves processing performed by the first service control plane, a second service control plane, and by an identity management and authorization service (IDMAS). Details related to the processing performed as part of this workflow are depicted in FIGS. 2, 3, 4, 5, 6, and 7, and described below.

FIG. 1 is a simplified block diagram of a distributed environment 100 according to some embodiments. The distributed environment 100 may comprise multiple computer systems communicatively coupled to each other via one or more communication links over one or more communication networks. The distributed environment 100 in FIG. 1 includes a Service-A infrastructure 110, a Service-B infrastructure 120, a customer tenancy 130, an identity management and authorization service 140, and a user-operated console 106.

The distributed environment depicted in FIG. 1 is merely an example and is not intended to unduly limit the scope of claimed embodiments. Many variations, alternatives, and modifications are possible. For example, in some implementations, the distributed environment 100 may have more or fewer computer systems or components than those shown in FIG. 1, or may have a different configuration or arrangement of computer systems and communication lines.

The various components depicted in FIG. 1 may be implemented using one or more computer systems. An example computer system may comprise compute resources (e.g., one or more processors or CPUs), memory resources (e.g., system memory, non-volatile memory), and networking resources (e.g., network interface cards (NICs)). A computer system may use the networking resources to communicate with one or more other computer systems over one or more communication networks. The communication networks may include, for example, the Internet, an intranet, an extranet, a Local Area Network (LAN), a Wide Area Network (WAN), and other networks facilitating communications, and combinations thereof. The communications may occur over wired or wireless links using one or more wired or wireless communication protocols. In certain implementations, the communication network may include a physical substrate network provided by an IaaS provider.

In certain implementations, the various components depicted in FIG. 1 may be hosted by infrastructure provided by a cloud service provider (CSP), such as an Infrastructure-as-a-Service (IaaS) provider. In an IaaS model, the CSP provides infrastructure (referred to as cloud services provider infrastructure or CSPI) that can be used by customers to build their own customizable private networks referred to a virtual cloud networks (VCNs). Customers can deploy one or more customer resources or workloads, such as compute instances, on these VCNs. A compute instance can be a virtual machine or a bare metal instance. A virtual machine (VM) compute instance may be an independent virtualized machine that runs on a physical bare metal computer system. Virtualization technologies, such as a hypervisor, makes it possible to run multiple virtual machine compute instances on the same physical computer system (also referred to as a host machine). A bare metal compute instance is hosted by a bare metal server or host machine without a hypervisor. When a bare metal compute instance is provisioned, a single customer or tenant maintains control of the physical CPU, memory, and network interfaces of the computer system hosting the bare metal instance and the computer system is not shared with other customers or tenants.

When a customer signs up as a subscriber for IaaS services provided by a IaaS CSP, an account referred to as the customer's tenancy is created for the customer. For example, as depicted in FIG. 1, a customer tenancy 130 may be created for a subscribing customer. In certain implementations, a tenancy, such as customer tenancy 130 provides a root level compartment that holds all the cloud resources for the customer. Separate distinct tenancies may be created for separate different customers. In a typical scenario, a customer only have access to resources that are placed within that customer's tenancy. A customer may create additional compartments within the customer's root tenancy (root compartment) for further controlling access to the resources placed within those additional compartments. This is achieved by associating one or more access policies with a compartment to control access to the resources in the compartment. When a cloud resource (e.g., a compute instance, block volume, cloud network, etc.) is created for a customer, the customer may specify a specific compartment within which to place the resource. In the simplest default scenario, the cloud resources for the customer are placed within the customer root tenancy. For example, in FIG. 1, the customer's cloud resources, such as Service A compute instance 131 and Service B compute instance 132 may be placed within the root compartment created for customer tenancy 130.

In addition to subscribing to IaaS services, a customer may subscribe to various other services that may be provided by one or more CSPs. These services may include services provided under a Software-as-a-Service (SaaS) model, a Platform-as-a-Service (PaaS) model, and other types of cloud services. The term cloud service is generally used to refer to a service that is made available by a CSP to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

For example, in the embodiment depicted in FIG. 1, a customer may subscribe to a "Service A" that is provided by a CSP using Service-A infrastructure 110, and to a separate "Service B" that is provided by a CSP using Service-B infrastructure 120. The Service-A infrastructure 110 is configured to provision and manage cloud resources related to Service A for one or more subscribing customers. The Service-A infrastructure 110 may operate within a Service-A tenancy 115 that has been created specifically for that service. A user 105 of the subscribing customer may, using a console 106, send a request to Service-A Infrastructure 110 requesting a compute instance that provides Service A. In response, the Service-A infrastructure 110 may provision a Service-A compute instance 131 (e.g., a specific instance providing Service-A) for the user 105. As shown in FIG. 1, the provisioned Service-A compute instance 131 can be stored within the customer tenancy 130. Service-A infrastructure 110 is responsible for the lifecycle management and configuration of Service-A compute instance 131.

In certain implementations, as shown in FIG. 1, the Service-A Infrastructure 110 may include a Service-A control plane 112 that is responsible for provisioning cloud resources for customers (e.g., Service-A Compute Instance 131), configuring the compute instance, updating the compute instance, and performing life cycle management for the Service-A compute instance 131. Service-A control plane 112 may provide similar services to other customers subscribing to Service A. The Service-A control plane 112 may include a front end 113 component for receiving commands and otherwise communicating with the user 105, for example, via the console 106. The Service-A infrastructure 110 can also include a workflow component 114 that is responsible for performing processing corresponding to user requests received by the front end 113. In certain embodiments, the workflow component 114 may be responsible for configuring and executing one or more workflow processes for performing processing corresponding to user requests received by control plane 112.

The Service-B infrastructure 120 is configured to provision and manage cloud resources related to Service B for a subscribing customer. The Service-B infrastructure 120 may operate within a Service-B tenancy 125 that has been created specifically for that service. A user 105 of the subscribing customer may, using a console 106, send a request to Service-B Infrastructure 120 requesting a compute instance that provides Service B. In response, the Service-B infrastructure 120 may provision a Service-B compute instance 133 (e.g., a specific instance providing Service-B) for the user 105. As shown in FIG. 1, the provisioned Service-B compute instance 132 can be stored within the customer tenancy 130. Service-B infrastructure 120 is responsible for the lifecycle management and configuration of Service-B compute instance 132.

In certain implementations, as shown in FIG. 1, the Service-B Infrastructure 120 may include a Service-B control plane 122 that is responsible for provisioning cloud resources for customers (e.g., Service-B Compute Instance 132), configuring the compute instance, updating the compute instance, and performing life cycle management for the Service-B compute instance 132. Service-B control plane 122 may provide similar services to other customers subscribing to Service B. The Service-B control plane 122 may include a front end 123 component for receiving commands and otherwise communicating with the user 105, for example, via the console 106. The Service-B infrastructure 120 can also include a workflow component 124 that is responsible for performing processing corresponding to user requests received by the front end 123. In certain embodiments, the workflow component 124 may be responsible for configuring and executing one or more workflow processes for performing processing corresponding to user requests received by control plane 122.

It is to be noted that the Service A tenancy 115, Service B tenancy 125, and customer tenancy 130 are three separate tenancies. Service-A Infrastructure 110 cannot access or control cloud resources provisioned by Service-B Infrastructure 120. For example, Service-A Infrastructure 110 cannot access Service-B compute instance 132. Likewise, Service-B Infrastructure 120 cannot access or control cloud resources provisioned by Service-A Infrastructure 110. For example, Service-B Infrastructure 120 cannot access Service-A compute instance 131.

Since Service-A compute instance 131 and Service-B compute instance 132 are provisioned and controlled by entities within two different tenancies, for example, Service A tenancy 115 and Service B tenancy 125, the two compute instances cannot and do not interact with each other. However, there may be situations where a customer may benefit from resources received from two different services to be able to interact with and work with each other. For example, the customer with customer tenancy 130 may benefit from Service-A compute instance 131 and Service-B compute instance 132 being able to work together. In this sense, the customer may wish to "attach" the two compute instances to enable such cooperative functioning of the compute instances. For example, let's assume that Service A is a SaaS service providing enterprise application services, such as Enterprise Resource Planning (ERP) services. Service-A compute instance 131, which is provisioned by Service-A Infrastructure 110, thus may provide ERP services for the customer. Further, assume that Service B is a conversational Artificial Intelligence (AI) service (also referred to as a digital assistant or chatbot service). Service-B Infrastructure 120 is configured to create and train a chatbot service instance (e.g., Service-B compute instance 132) for the customer, where the chatbot service instance is configured to respond to spoken and/or written utterances. The customer may want to interact with their ERP service via a chatbot. To achieve this, the customer may desire to attach their chatbot service instance (e.g., Service-B compute instance 132) to their ERP compute instance (e.g., Service-A compute instance 131).

In the past, such an attachment could be achieved only by making customized changes to the code implementing the two compute instances to be attached. Such as solution is however specific to only those compute instances and cannot generally be applied to other cloud resources to be attached. Further, because of the specific code changes that have to be applied to the two compute instances to be attached, the process takes a long time, is specific to only those compute instances, and cannot be applied to other types of compute instances. As a result, such an attachment could not be requested by a customer on-demand.

The present disclosure describes solutions to the above-described problems. As described herein, an infrastructure and a generalized method is described for attaching (also referred to as "wiring") two (or more) cloud resources (e.g., two compute instances) in spite of the compute resources being provisioned by two different services from different cloud tenancies. An automated process is described that is executed for wiring the compute instances. The automated process can be generally applied to attach any two compute instances providing two different services and provisioned from two different service tenancies.

For example, in the embodiment depicted in FIG. 1, a user 105 may, via console 106, send a request to Service-A Infrastructure 110 to attach Service-A compute instance 131 and Service-B compute instance 132. The request may be received and processed by Service-A control plane 112. A workflow is then executed for attaching the two compute instances, wherein the workflow involves processing performed by Service-A control plane 112, Service-B control plane 122, and by identity management and authorization service (IDMAS) 140. Details related to the processing performed as part of this workflow is depicted in FIGS. 2, 3, 4, 5, 6, and 7, and described below. The overall workflow for attaching two compute instances may involve individual workflows executed by Service-A Infrastructure 110, Service-B Infrastructure 120, and by the IDMAS 140.

For example, in the example previously described regarding an ERP service compute instance and a Chatbot compute instance, the user may request the two compute instances to be attached. Processing is then performed to perform the attachment. As a result of the attachment, users of the ERP compute instance may now be able to interact with the ERP instance using conversations with the chatbot instance.

Figure 3:
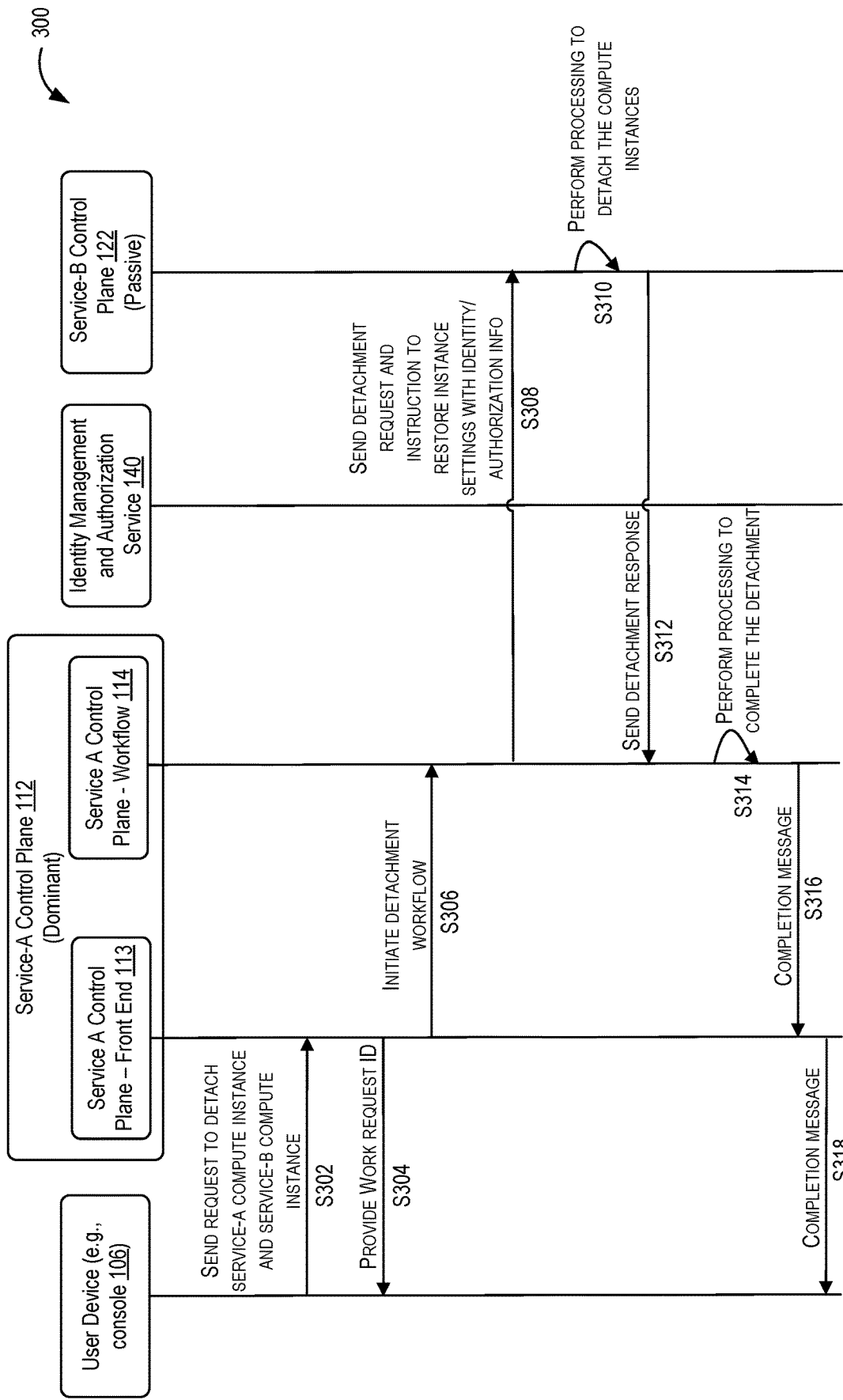
FIG. 3 depicts a simplified swimchart depicting a process for detaching two compute instances that are attached within a customer tenancy, according to certain embodiments.

When the attachment between two attached compute instances is no longer desired by the customer, a customer user may, on demand, request detachment (i.e., break the attachment) of the previously attached compute instances. For example, in the embodiment depicted in FIG. 1, a user 105 may, via console 106, send a request to Service-A Infrastructure 110 to detach previously attached Service-A compute instance 131 and Service-B compute instance 132. The request may be received and processed by Service-A control plane 112. A workflow is then executed for detaching the two compute instances, wherein the workflow involves processing performed by Service-A control plane 112, Service-B control plane 122, and by identity management and authorization service 140. Details related to the processing performed as part of this workflow are depicted in FIG. 3, and described below.

Embodiments described herein thus enable a user 105 to, on demand, request that two compute instances become attached and be able to communicate with each other, or become detached, again on demand. As illustrated in FIG. 1, the attachment is symbolically shown using attachment link 133, which represents a communicative link between the Service-A compute instance 131 and the Service-B compute instance 132.

Information associated with the attachment/detachment processing can be stored by the Service-A infrastructure 110 as attachment/detachment information 111. Likewise, information associated with the attachment/detachment processing may be stored by Service-B infrastructure 120 as attachment/detachment information 121.

The identity management and authorization service 140 is configured to provide services for checking whether the requesting user is authorized to request the attachment or detachment for the particular set of compute instances to be attached or detached. The authorization may be based upon access control policies defined for the service instances being attached or detached. For example, policies may be defined for customer tenancy 130 that control which instances can be attached/detached, which users are allowed to request attachment/detachments, and the like. The identity management and authorization service 140 can evaluate such policies to determine whether a request can be authorized. The identity management and authorization service 140 can enable the Service-A infrastructure 110 and the Service-B infrastructure 120 to communicate with one another on behalf of the user 105 during an attachment process (or during a detachment process).

Figure 2:
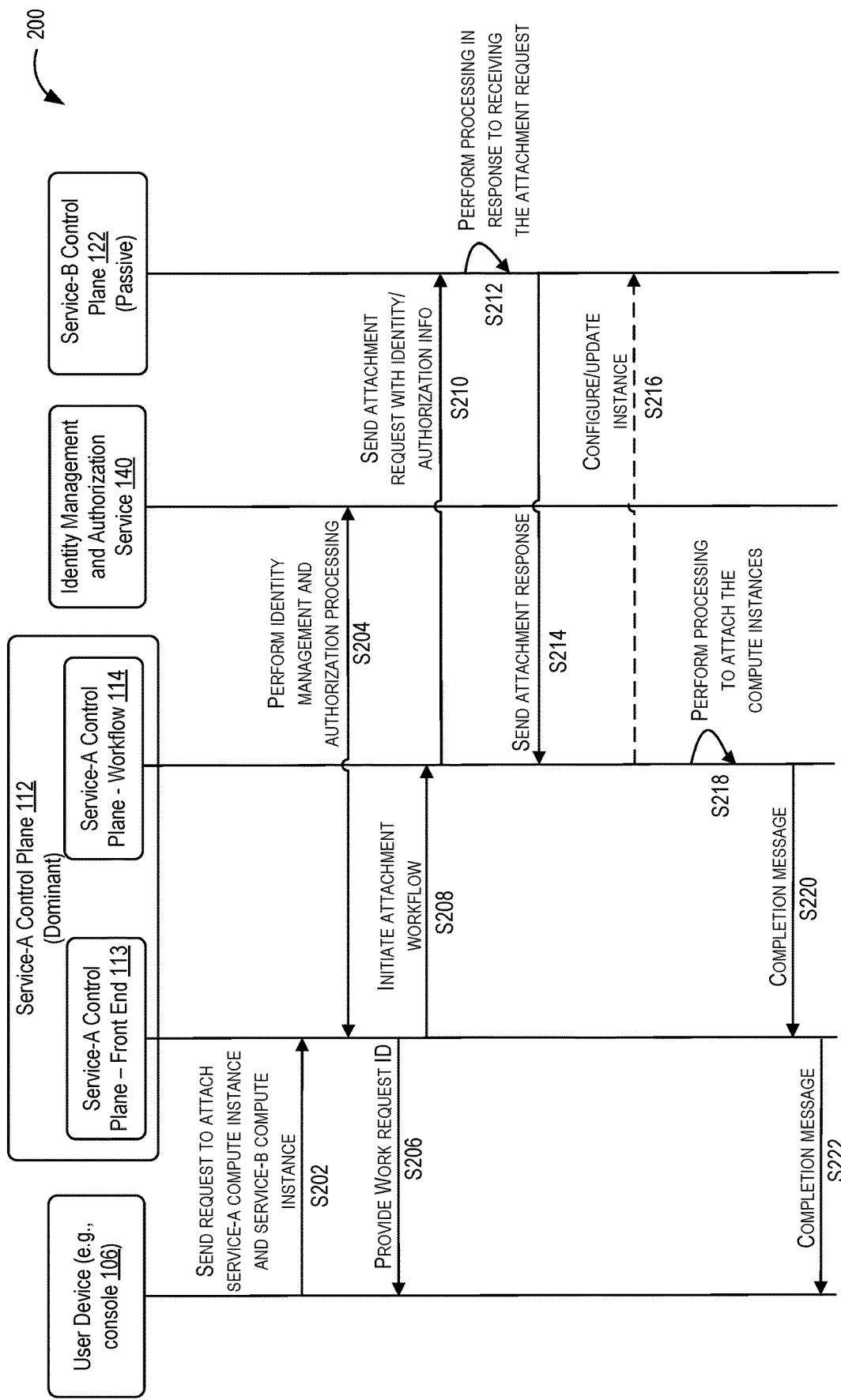
FIG. 2 depicts a simplified swimchart depicting a process for attaching two compute instances within a customer tenancy, according to certain embodiments.

FIG. 2 depicts a simplified swimchart 200 depicting a process for attaching two compute instances within a customer tenancy, according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel.

The swimchart 200 illustrates a process for attaching two compute instances. It is assumed for the process depicted in FIG. 2 that the two compute instances to be attached already exist prior to receiving the attachment request. For example, the two compute instances being attached may have been previously created prior to receiving the attachment request. In certain embodiments, when a request is received to attach two instances from two services, if the instances do not already exist, as part of the processing, the compute instances may first be created by interacting with the respective service infrastructures, and then the compute instances attached per the processing depicted in FIG. 2.

For example, in the embodiment depicted in FIG. 1, the user 105 can (e.g., via the console 106) send an instruction to the Service-A control plane front end 113 to create a first compute instance for Service-A. In response to receiving the user instructions, the Service-A control plane workflow 114 can create and configure a Service-A compute instance 131 (e.g., a substantiation of the first service) within the user's customer tenancy 130. The Service-A control plane 112 can continue to control and manage the Service-A compute instance 131. Similarly, the user 105 can (e.g., via the console 106) send an instruction to the Service-B control plane 122 to create a second compute instance for Service-B. In response to receiving the user instructions, the Service-B control plane 122 can create and configure a Service-B compute instance 132 (e.g., a substantiation of the second service) within the user's customer tenancy 130. The Service-B control plane 122 can continue to control and manage the Service-B compute instance 132.

While both the Service-A compute instance 131 and the Service-B compute instance 132 can be within the customer tenancy 130, the Service-A compute instance 131 and the Service-B compute instance 132 can be independently created and are initially isolated from each other within the customer tenancy 130. Typically, the Service-A control plane 112 has ownership of the Service-A compute instance 131, and as a result only the Service-A control plane 112 can access and configure the Service-A compute instance 131. Similarly, typically the Service-B control plane 122 has ownership of the Service-B compute instance 132, and as a result only the Service-B control plane 122 can access and configure the Service-B compute instance 132. Because of this separation, the Service-A compute instance 131 and the Service-B compute instance 132 typically cannot communicate or share information with one another.

The processing depicted in FIG. 2 and described below enables the Service-A compute instance 131 and the Service-B compute instance 132 to become attached, based on the user's instruction. As a result of the attachment, the Service-A compute instance 131 and the Service-B compute instance 132 can communicate and exchange information. Also, the Service-A control plane 112 can own, control, and/or configure both the Service-A compute instance 131 and the Service-B compute instance 132.

As shown in FIG. 2, processing may be initiated at S202, when the user 105 using a user device (e.g., console 106) sends a request to Service-A control plane 112 to attach the Service-A compute instance 131 and the Service-B compute instance 132.

For purposes of this disclosure, the control plane receiving the attachment request from a user is referred to as the "dominant" control plane, and the other control plane is referred to as the "passive" control plane. The dominant control plane initiates the attachment process, and includes necessary functionality and APIs for performing the attachment. For example, in FIG. 2, since Service-A control plane 112 receives the attachment request in S202, it is the dominant control plane while Service-B control plane 122 is the passive control plane.

In the example depicted in FIG. 2, the instruction is received by the Service-A control plane front end 113. Since two separate compute instances created by two separated service control planes are to be attached, in certain embodiments, the attachment request may be sent to either one of the two service control planes. For example, if Service-A compute instance 131 and Service-B compute instance 132 are to be attached, the attachment request may be sent by the user device (e.g., console 106) to either Service-A control plane 112 or to Service-B control plane 122. The user 105 via the user device (e.g., console 106) can decide to which service to send the instruction. For example, the user 105 via the user device (e.g., console 106) can select the Service-A from a list displayed at a user interface.

In some other implementations, for two compute instances to be attached, the request to attach may have to be sent to a particular one of the two service control planes. For example, as one example, for Service-A compute instance 131 and Service-B compute instance 132 to be attached, the attachment request may have to be sent to Service-A control plane 112 and not to Service-B control plane 122. In such implementations, only one of the control planes (e.g., the Service-A control plane 112) may be capable of being the dominant control plane (e.g., based on available processing capabilities and APIs). In such a case, the user device (e.g., console 106) has to send the attachment request to the particular control plane that is capable of being the dominant control plane.

In certain embodiments, after the attachment process is completed, due to the attachment, the dominant control plane will have control and ownership of the passive control plane's compute instance (within the customer tenancy). As a result of this, certain operations (e.g., deleting a compute instance) that the passive control plane could perform on its compute instance are no longer allowed as long as the attachment persists. Instead, in such embodiments, the passive control plane receives and obeys attachment messages and instructions from the dominant control plane, and allows the dominant control plane to take control of the passive control plane's compute instance.

After receiving an attachment request, the dominant control plane may then initiate processing to determine if the attachment request can be performed. For example, processing may be performed to determine if the user requesting the attachment is authorized to make such a request. In certain implementations, the identity management and authorization service 140 may perform processing for the authorization. Accordingly, at S204, the dominant control plane (in this example, the Service-A control plane 112) may send the identity management and authorization service 140 information related to the request received in S202. The identity management and authorization service 140 may then initiate an authorization process. If the authorization is successful (i.e., the user is allowed to request attachment of the two identified compute instances), then, as part of S204, the identity management and authorization service 140 may send a response back to the dominant control plane (i.e., Service-A control plane 112) providing authorization for the attachment processing to proceed.

In some embodiments, the response sent by the identity management and authorization service 140 to the Service-A control plane 112 may include an On-Behalf-Of (OBO) token. The OBO token sent to the Service-A control plane 112 serves as a token or evidence that the Service-A control plane 112 is authorized to send attachment-related instructions on behalf of the user device (e.g., console 106) to Service-B control plane 122. In certain implementations, the OBO token may be included as proof of authorization in every subsequent communication from the Service-A control plane 112 to the Service-B control plane 122 (in general, in communications from the dominant control plane to the passive control plane).

In certain embodiments, a check may also be performed to see if an attachment between the two compute instances is permitted. In such implementations, attachments may be allowed only between certain types of compute instances, i.e., may be allowed only between compute instances of certain services. Information may be stored identifying the attachments between services that are allowed. If the request received in S202 identifies two compute instances whose attachment is not permitted, then the attachment process may be terminated and an error message returned to the requesting user. For example, if attachment between a Service-A compute instance and a Service-B compute instance is not permitted, then a request to attach compute instances 131 and 132 may not be permitted. In certain implementations, this check to see if attachment between the two identified compute instances is permitted or not is performed by the dominant control plane after receiving the attachment request. The dominant control plane may access information identifying permitted attachments to determine where the particular requested attachment is allowed. In some other implementations, this check may be performed by the identity management and authorization service 140.

The processing to perform the attachment may be performed synchronously or asynchronously. In some implementations, an asynchronous implementation is preferred since the requesting user then does not have to wait (or is not locked) until the entire processing is completed. Accordingly, in implementations using asynchronous processing, at S206, the Service-A control plane front end 113 creates an asynchronous work request for performing the processing and provide a work request identifier to the user device (e.g., console 106). A user device (e.g., console 106) can request updates regarding the status of the attachment processing by sending the work request ID.

At S208, after having completed the identity management and authorization processing in step S204, the Service-A control plane front end 113 instructs the Service-A control plane workflow 114 component to initiate the workflow for creating the attachment. In some embodiments, the Service-A control plane front end 113 can provide an OBO token to the Service-A control plane workflow 114 for use in communications with Service-B control plane 122 for creating the attachment.

At S210, the Service-A control plane workflow 114 (i.e., the dominant control plane) sends an attachment request to the Service-B control plane 122 (i.e., the passive control plane). The attachment request informs the Service-B control plane 122 that a compute instance owned by the Service-B control plane 122 is being attached to another compute instance owned by the dominant control plane (i.e., the Service-A control plane 122). The attachment request message includes a payload of any suitable information associated with the attachment. For example, the attachment request can include identity/authorization information indicating that the Service-A control plane 112 is authorized to initiate creation of the attachment. For example, an OBO token received by Service-A control plane 112 in S204 may be included in the request sent in S210. Additionally, the attachment request can indicate the instances that are to be attached (e.g., the Service-A compute instance 131 and the Service-B compute instance 132). The compute instances may be identified using identifiers that uniquely identify the instances, for example, using their respective Oracle Cloud Identifiers (OCIDs).

Additionally, the attachment request can indicate the identities of the dominant control plane and the passive control plane. For example, in the example in FIG. 2, the dominant control plane is the Service-A control plane 112 and the passive control plane is Service-B control plane 122. This also identifies the dominant compute instance and the passive compute instance. Because the Service-A control plane 112 is the dominant control plane, the Service-A compute instance 131 is referred to as the dominant compute instance. Similarly, because the Service-B control plane 122 is the passive control plane, the Service-B compute instance 132 is referred to as the passive compute instance in the attachment.

Additionally, in certain embodiments, due to the attachment, restrictions are placed on the operations that can be performed on the passive compute instance by (a) the customer, and (b) by the passive control plane. In certain implementations, the attachment request sent in S210 can include information that indicates these restrictions. For example, the request may identify, for each of the customer and for the passive control plane, a list of one or more operations that are permitted or not permitted on the passive compute instance by the customer and/or the passive control plane due to the attachment. The request may identify a list of one or more operations that are permitted or not permitted on the passive compute instance by the customer due to the attachment. In certain implementations, for each of the customer and the passive service control plane, a list of permitted operations is provided. Any operation not specifically specified in the list is not allowed while the attachment is present. In some embodiments, the operation for deleting the passive compute instance (e.g., Service-B compute instance 132) may no longer be included in the new list of customer-permitted operations. In some embodiments, the operation to delete the attachment may only be allowed for the owner, and not the customer.

An example of an attachment request, which can be referred to as CREATE ATTACH API, is shown below:
POST/ServiceBInstances/<instanceId>/attachments/{
  "attachToId":
    "ocid1.ServiceAinstance.oc1..aaaaaaaat733hgqhsleu
      eh6yeqyx3gnbiik47cca4juks m1odvzr3b6cwbpa",
  "attachmentType": "ServiceA", //Known enum
  "attachmentMetadata": { }, //attachment specific metadata
  "ownerMetadata": {//owner specific metadata
    "ownerService": ["ServiceA-control-plane"],  //SP name of ServiceACP. It's a list to support multiple SP names for the same service
      // A * of some sort will mean manage all-permissions-for-this-resource.
    "allowedOwnerOperations": //List of operations owner is supposed to be able to perform
    "allowedCustomerOperations": //List of control plane permission strings, that are allowed for all other callers
  }
}

As shown in the above request, the passive compute instance (in the above example, the Service B instance is being attached to the dominant compute instance (in the above example, the Service A instance). In the request, the "attachToId" provides an identifier (e.g., OCID) for the dominant compute instance to which the passive compute instance will be attached. The "attachmentType" identifies the type of the dominant compute instance, i.e., the service provided by the dominant compute instance. The "attachmentMetadata" provides attachment-specific metadata. The "ownerMetadata" provides owner-specific metadata. The "ownerService" identifies the service provider name associated with the dominant control plane. In the above example, the name is "ServiceA-control-plane." The "allowedOwnerOperations" identifies operations that are allowed by the owner (i.e., the dominant control plane) while the attachment is present. For example, the dominant control plane (i.e., Service-A control plane 112) may be allowed to perform GET, LIST, UPDATE, and DELETE ATTACHMENT operations on the passive compute instance. The "allowedCustomerOperations" identifies operations that are allowed by the customer while the attachment is present. For example, the customer may only be allowed to perform GET, LIST, and UPDATE operations on the passive compute instance.

It is to be noted that, neither the customer (e.g., an administrator of the customer tenancy), the dominant control plane (i.e., Service-A control plane 112), nor the passive control plane (i.e., Service-B control plane 122) are allowed to delete the passive compute instance (i.e., Service-B compute instance 132) while the attachment is present. Thus, even though, passive control plane (i.e., Service-B control plane 122) is the creator and owner of the passive compute instance (i.e., Service-B compute instance 132), during the attachment, it is not allowed to delete the passive compute instance (i.e., Service-B compute instance 132).

At S212, the Service-B control plane 122 (i.e., the passive control plane) performs processing in response to receiving the attachment request. This can include storing (also referred to as "posting") the attachment request details received from the Service-A control plane 112 (i.e., from the dominant control plane) in a record to persist the attachment information, and modifying ownership and allowed operations associated with the Service-B compute instance 132 (i.e., with the passive compute instance).

For example, the Service-B control plane 122 may create and store a record indicating that the Service-B compute instance 132 (e.g., as identified by an associated OCID) is now attached to the Service-A compute instance 131 (e.g., as identified by an associated OCID) within the customer tenancy 130. The record can indicate that the Service-B compute instance 132 is the passive compute instance, and the Service-A compute instance 131 is the dominant compute instance. Additionally, the record can indicate the associated control planes and their respective roles. For example, the dominant control plane may be the Service-A control plane 112 and the passive control plane may be the Service-B control plane 122. The record can also include information indicating the type of service (i.e., the service provided by the dominant compute instance) to which the passive compute instance is being attached. Further, the record can indicate that the Service-A control plane 112 is now the owner of the Service-B compute instance 132 (i.e., because the Service-A control plane 112 is the dominant control plane in this example). The Service-B control plane 122 can thereby give control and ownership of the Service-B compute instance 132 to the Service-A control plane 112. The record can also indicate what operations will be allowed at the Service-B compute instance 132 while the attachment exists, and the operations may be a modification of the previously-permitted operations. The operations can include customer-permitted operations and owner-permitted operations (e.g., operations that can be performed by the dominant control plane) for the Service-B compute instance 132. For example, a delete operation may not be included in the customer-permitted operations, and thereby may not be possible to perform while the attachment exists.

In some embodiments, the Service-B control plane 122 may verify that the Service-A control plane 112 is authorized to initiate creation of the attachment. For example, the Service-B control plane 122 can verify the authenticity of an OBO token and/or permissions associated with the OBO token.

In some embodiments, as part of S212, the Service-B control plane 122 may modify and configure the Service-B compute instance 132 within the customer tenancy 130 to show that an attachment exists.

As previously indicated, in certain implementations, the processing to perform the attachment may be performed asynchronously. In that case, the Service-A Control Plane 112 may periodically poll the Service-B control plane 122 to determine the status of the processing of the attachment request being performed by Service-B control plane 122. In some embodiments, the Service-B control plane 122 can provide an asynchronous request identifier to the Service-A Control Plane 112 to confirm that the attachment request was received and is being processed. The Service-A Control Plane 112 can then use the asynchronous request identifier when polling the Service-B control plane 122 for the current processing status. Eventually, the Service-B control plane 122 responds with a message indicating that attachment processing has been completed at the Service-B control plane 122. The message may indicate either success or failure of the processing performed by Service-B control plane 122.

Accordingly, at S214, the Service-B control plane 122 sends an attachment response to the Service-A Control Plane 112 indicating that the attachment has been processed at the Service-B control plane 122. The attachment response message can inform the Service-A Control Plane 112 that the attachment details have been acknowledged and implemented in accordance with the attachment request message sent at step S210.

An example of the attachment response message sent from the passive control plane (e.g., Service-B control plane 122) to the dominant control plane (e.g., Service-A control plane 112), is shown below:
Response=>
{
  "id":     "ocid1.serviceattachment.oc1.uk-london-1.aaa aa. . . . "
    //attachment id, generated by the passive control plane
  "instanceId":
    "ocid1.ServiceBinstance.oc1.uk-london-1.amaaaaaaaxki4uqarjeyspipvniykktxvdglpc52ycz7rr xibl5tcvflccoaa"
  "attachToId":
    "ocid1.ServiceAinstance.oc1..aaaaaaaat733hgqhsleue h6yeqyx3gnbiik47cca4juks m1odvzr3b6cwbpa"
  "compartmentId": "compartment of the instance or this attachment"
  "attachmentType": "ServiceA"
  "ownerMetadata":
    "attachmentType": "ServiceA"//polymorphic discriminator
    "ownerService": [" ServiceA-control-plane"]
    //Additional Custom fields per Service Provider. Example, Service A Control Plane may defining the following two. Other Service Providers can define their own.
    "allowedCustomerOperations": //List of control plane permission strings, that are allowed for all other callers "allowedOwnerOperations": //List of operations owner can perform
  }
  "lifecycleState": "ATTACHING"
}

As shown in the above request, the "id" provides an identifier for the attachment. The "instanceID" provides an identifier (e.g., OCID) for the passive compute instance that is now attached to the dominant compute instance. The "attachToId" provides the identifier (e.g., OCID) for the dominant compute instance to which the passive compute instance is now attached. The "compartmentId" identifies the compartment of the passive compute instance or the attachment (e.g., the compartment within the customer tenancy 130 where the passive compute instance is located). The "attachmentType" identifies the type of the dominant compute instance, i.e., the service provided by the dominant compute instance. The "ownerMetadata" indicates the following additional data fields. The "ownerService" identifies the service provider name associated with the dominant control plane. In the above example, the name is "ServiceA-control-plane." Additional data fields can be included as configured for a specific service and control plane. For example, the "allowedCustomerOperations" identifies operations that are allowed by the customer while the attachment is present. For example, the customer may be allowed to perform GET, LIST, UPDATE, and ATTACH operations on the passive compute instance. The "allowedOwnerOperations" identifies operations that are allowed by the owner (i.e., the dominant control plane) while the attachment is present. For example, the dominant control plane (i.e., Service-A control plane 112) may be allowed to perform GET, LIST, and UPDATE, operations on the passive compute instance. The "lifecycleState" indicates what operation is currently being performed for the attachment. In the above example, the "lifecycleState" is "attaching" because the attachment is being established.

Optionally, at S216, the Service-A Control Plane 112 (i.e., the dominant control plane) may send instructions to the Service-B control plane 122 (i.e., the passive control plane) to configure and/or update the Service-B compute instance 132 within the customer tenancy 130. For example, depending on the type of compute instance, the Service-A Control Plane 112 may install functionality (e.g., skills for a chatbot compute instance) for the Service-B compute instance 132 that enable communications between Service-B compute instance 132 and Service-A compute instance 131.

At S218, the Service-A Control Plane 112 (i.e., the dominant control plane) performs processing to attach the compute instances in response to receiving the attachment response from the Service-B control plane 122 (i.e., from the passive control plane). For example, the Service-A Control Plane 112 may store any suitable information in a record to persist the attachment information at the dominant control plane. This can include storing a compartment ID (e.g., within the customer tenancy 130) of the Service-B compute instance 132 as indicated by the Service-B control plane 122. Further, the Service-A Control Plane 112 can identify what allowed operations were agreed to and/or provided by the Service-B control plane 122.

In some embodiments, as part of the processing performed in S218, the Service-A Control Plane 112 can perform identity wiring so that the Service-A compute instance 131 and the Service-B compute instance 132 can communicate with each other. This can include setting and persisting Oracle Identity Cloud Service (IDCS) OAuth credentials so that future service calls can be performed using the OAuth credentials.

In some embodiments, as part of the processing performed in S218, the Service-A Control Plane 112 can configure the Service-A compute instance 131 and/or the Service-B compute instance 132 to show the attachment.

At this point, both control planes have agreed to the attachment and performed processing to complete the attachment, such as storing information associated with the attachment and modifying certain permissions, ownership, and configurations. The Service-B control plane 122 (i.e., the passive control plane) has given control and ownership of the Service-B compute instance 132 (i.e., the passive compute instance) to the Service-A Control Plane 112 (i.e., the dominant control plane). As a result, the Service-A Control Plane 112 (the dominant control plane) now has control and ownership of both the Service-A compute instance 131 (i.e., the dominant compute instance) and the Service-B compute instance 132 (i.e., the passive compute instance), and no other service control plane can claim ownership of the Service-B compute instance 132. The Service-A compute instance 131 and the attached Service-B compute instance 132 both continue to reside within the customer tenancy 130.

The attachment and the Service-A Control Plane's temporary ownership of the Service-B compute instance 132 remain valid until the attachment is deleted through a subsequent detach API call. In some embodiments, the Service-B compute instance 132 cannot be deleted while the attachment exists. To delete the Service-B compute instance 132, the compute instances have to be detached first, and then the Service-B compute instance 132 can be deleted. If the user device (e.g., console 106) attempts to delete the Service-B compute instance 132 via the Service-B Control Plane 122 that no longer has ownership of the Service-B compute instance 132, the deletion attempt will be denied due to the existing attachment. If the user device (e.g., console 106) attempts to delete the Service-B compute instance 132 via the Service-A Control Plane 112 that now has ownership, the user device (e.g., console 106) will be notified that an attachment exists and therefore the Service-B compute instance 132 cannot be deleted until the compute instances are detached.

At S220, the Service-A Control Plane Workflow 114 can send a completion message back to the Service-A Control Plane front end 113 indicating that the attachment was successfully established (or alternatively, if there was a failure). Then, at S222, the Service-A Control Plane front end 113 can send a completion message back to the user 105 (e.g., via the user device such as console 106) indicating that the attachment was successfully established (or indicating a failure).

As a result of the processing depicted in FIG. 2, two compute instances, from two different services operating in two different service tenancies, that are normally separate, independent, and without any dependencies or attachments can now become attached so that they communicate with each other and work together (e.g., via API calls), when desired by the user 105. Embodiments allow interactions or communications between the two compute instances to be unidirectional or bidirectional.

As an example, the Service-A compute instance 131 can be a compute instance of the Fusion Applications Service, which can provide customer relationship management services. The Service-B compute instance 132 can be a compute instance of the Oracle Digital Assistant (ODA) application, which can provide customer interaction services such as a chat bot. The user can provide information for configuring and/or training the ODA instance, such as a certain set of questions and corresponding response answers as stored in the Fusion Applications Service. As a result, when a customer submits a question to a chat bot, the chat bot can retrieve an answer from the Fusion Applications Service based on the question, and then provide the response answer to the customer.

The user 105 may desire to attach the Fusion compute instance and the ODA compute instance so that the two instances can interact and share information. Typically, the two instances cannot interact, and any sharing of information between the two instances is done manually by a human user. However, once attached using the above-described process, automated sharing of information can take place without requiring a human user. For example, the ODA compute instance can interact with a customer to receive a customer purchase order, the ODA compute instance can provide the purchase order information to the attached Fusion compute instance, and the Fusion compute instance can fulfill the purchase order.

In the example described above and depicted in FIG. 1, the dominant and the passive compute instances (e.g., Service-A compute instance 131 and the Service-B compute instance 132) are both created for the same customer and are thus under the same customer tenancy. However, in other embodiments, the two instances being attached can be in two different customer tenancies. This can be performed in the same manner as described with respect to FIG. 2 above for attaching two compute instances that are within the same customer tenancy. In other words, cross-tenancy attachment of instances is possible.

The process above describes attaching one compute instance to another compute instance, i.e., a 1-to-1 attachment. This however is not intended to be limiting. Other embodiments allow other types of attachments to be created involving multiple compute instances, such as 1-to-many (e.g., one dominant compute instance and multiple passive compute instances), many-to-1 (e.g., multiple dominant compute instances and one passive compute instance), and/or many-to-many type attachments (e.g., multiple dominant compute instances attached to multiple passive compute instances). In embodiments with multiple compute instances, the compute instances are instances by different services (e.g., multiple passive compute instances each corresponding to a different service).

FIG. 3 depicts a simplified swimchart 300 depicting a process for detaching two compute instances that are attached within a customer tenancy, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel.

The swimchart 300 illustrates a process for detaching two compute instances. It is assumed for the process depicted in FIG. 3 that the two compute instances to be detached already exist and are already attached prior to receiving the detachment request. For example, the two compute instances being detached may have been previously attached through to the processing described above with respect to FIG. 2.

As shown in FIG. 3, processing may be initiated at S302, when the user 105 using a user device (e.g., console 106) sends a request to Service-A control plane 112 to detach a Service-A compute instance 131 and a Service-B compute instance 132 within the user's customer tenancy 130.

In implementations using asynchronous processing, at S304, the Service-A control plane front end 113 creates an asynchronous work request for performing the processing and provide a work request identifier to the user device (e.g., console 106). The user device (e.g., console 106) can request updates regarding the status of the attachment processing by sending the work request ID.

At S306, the Service-A control plane front end 113 instructs the Service-A control plane workflow 114 component to initiate the workflow for detaching the two compute instances. In some embodiments, the Service-A control plane front end 113 can provide an OBO token to the Service-A control plane workflow 114 for use in communications with Service-B control plane 122 for detaching the two compute instances.

At S308, the Service-A control plane workflow 114 (i.e., the dominant control plane) sends a detachment request to the Service-B control plane 122 (i.e., the passive control plane). The detachment request informs the Service-B control plane 122 that a compute instance associated with the Service-B control plane 122 is being detached from another compute instance associated with the dominant control plane (i.e., the Service-A control plane 122) so that previous compute instance settings are restored. The detachment request message includes a payload of any suitable information associated with the attachment and detachment. For example, the detachment request can include identity/authorization information indicating that the Service-A control plane 112 is authorized to initiate the detachment. For example, an OBO token received by Service-A control plane 112 (e.g., in S204 of FIG. 2) may be included in the request sent in S308. Additionally, the attachment request can indicate the instances that are to be detached (e.g., the Service-A compute instance 131 and the Service-B compute instance 132). The compute instances may be identified using identifiers that uniquely identify the instances, for example, using their respective Oracle Cloud Identifiers (OCIDs). Additionally, the detachment request can indicate the identities of the dominant control plane and the passive control plane, as well as the corresponding dominant control plane and passive control plane. A detachment request may also include an identifier for the attachment.

Additionally, in certain embodiments, due to removal of the attachment, restrictions may be removed that were previously placed on the operations that can be performed on the passive compute instance. In certain implementations, the detachment request sent in S308 can include information that indicates the removal of these restrictions. For example, the request may identify, for each of the customer and for the passive control plane, a list of one or more operations that are permitted or not permitted on the passive compute instance by the customer and/or the passive control plane due to the attachment, and that should therefore be restored when the attachment is removed. In some embodiments, a list of operations associated with the attachment can be deleted, thereby deleting restrictions associated with the attachment.

At S310, the Service-B control plane 122 (i.e., the passive control plane) performs processing in response to receiving the detachment request. This can include deleting attachment details from a posted record, and modifying ownership and allowed operations associated with the Service-B compute instance 132 (i.e., with the passive compute instance). In some embodiments, the Service-B control plane 122 may verify that the Service-A control plane 112 is authorized to remove the attachment. For example, the Service-B control plane 122 can verify the authenticity of an OBO token and/or permissions associated with the OBO token. In some embodiments, as part of S310, the Service-B control plane 122 may modify and configure the Service-B compute instance 132 within the customer tenancy 130 to show that a previous attachment no longer exists.

At S312, the Service-B control plane 122 sends a detachment response to the Service-A Control Plane 112 indicating that the detachment has been processed at the Service-B control plane 122. The detachment response message can inform the Service-A Control Plane 112 that the previous attachment details have been removed and compute instance settings restored in accordance with the detachment request message sent at step S308.

At S314, the Service-A Control Plane 112 (i.e., the dominant control plane) performs processing to detach the compute instances in response to receiving the detachment response from the Service-B control plane 122 (i.e., from the passive control plane). For example, the Service-A Control Plane 112 may remove stored information about the previous attachment at the dominant control plane, restore a previous set of allowed operations, remove identity wiring, and/or configure the Service-A compute instance 131 and/or the Service-B compute instance 132 to no longer show an attachment.

At this point, both control planes have agreed to remove the attachment and performed processing to detach the compute instances, such as deleting storing information associated with the attachment and restoring certain permissions, ownership, and configurations. The Service-B control plane 122 (i.e., the passive control plane) has regained control and ownership of the Service-B compute instance 132 (i.e., the passive compute instance). As a result, the Service-A Control Plane 112 (the dominant control plane) no longer has control and ownership of the Service-B compute instance 132 (i.e., the passive compute instance). The Service-A compute instance 131 and the Service-B compute instance 132 both continue to reside within the customer tenancy 130.

At S316, the Service-A Control Plane Workflow 114 can send a completion message back to the Service-A Control Plane front end 113 indicating that the detachment was successfully completed (or alternatively, if there was a failure). Then, at S318, the Service-A Control Plane front end 113 can send a completion message back to the user 105 (e.g., via the user device such as console 106) indicating that the attachment was successfully removed (or indicating a failure).

Figure 4:
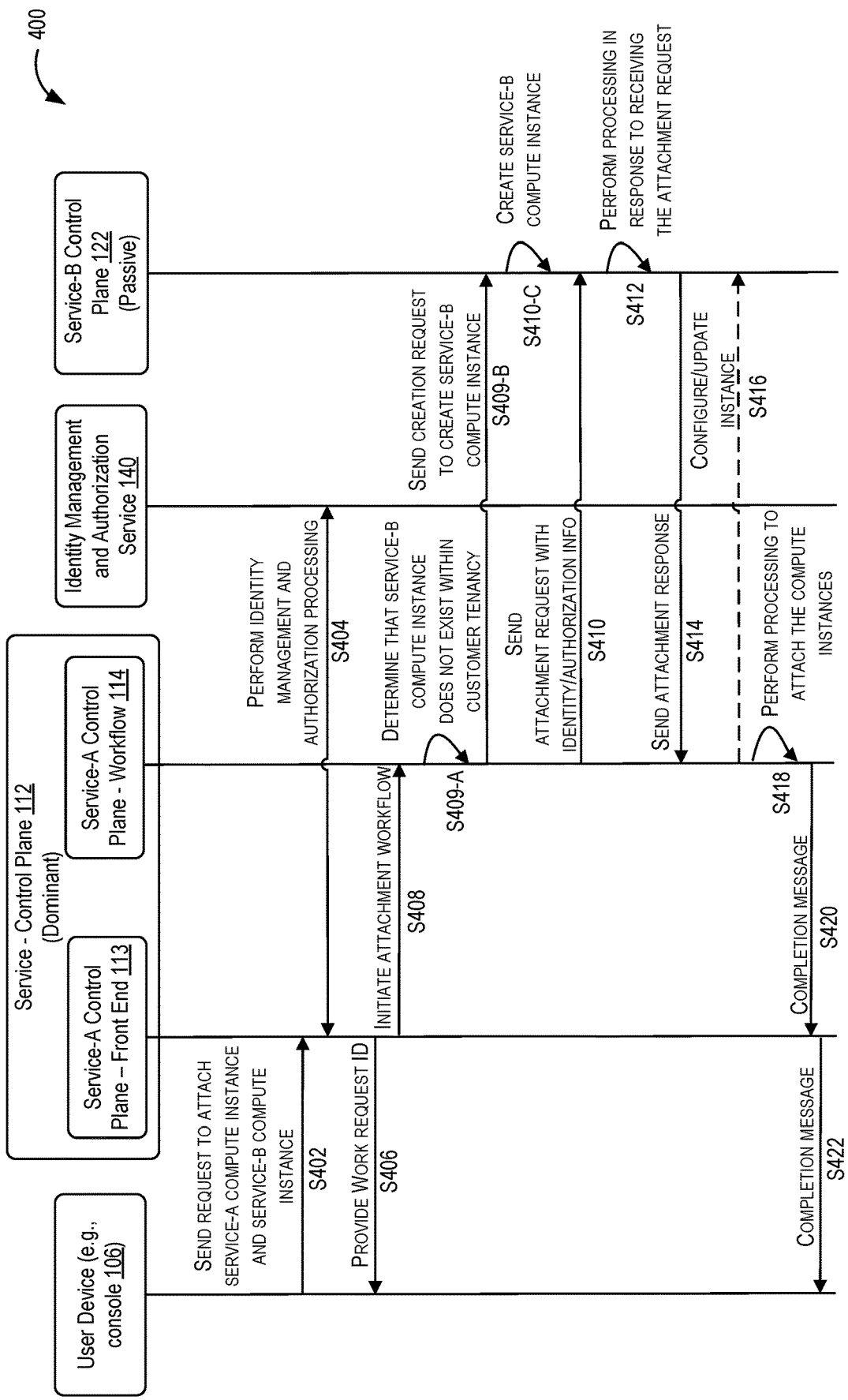
FIG. 4 depicts a simplified swimchart depicting a process for attaching two compute instances within a customer tenancy, where the passive instance does not yet exist and is created as a part of the process, according to certain embodiments.

FIG. 4 depicts a simplified swimchart 400 depicting a process for attaching two compute instances within a customer tenancy, where the passive instance does not yet exist and is created as a part of the process, according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel.

The swimchart 400 illustrates a process for attaching two compute instances. It is assumed for the process depicted in FIG. 4 that the dominant instance to be attached already exists prior to receiving the attachment request, and that the passive instance to be attached does not yet exist prior to receiving the attachment request. For example, the dominant compute instance being attached may have been previously created prior to receiving the attachment request, but the passive compute instance being attached has not been created prior to receiving the attachment request.

For example, in the embodiment depicted in FIG. 1, the user 105 can (e.g., via the console 106) send an instruction to the Service-A control plane front end 113 to create a first compute instance for Service-A. In response to receiving the user instructions, the Service-A control plane workflow 114 can create and configure a Service-A compute instance 131 (e.g., a substantiation of the first service) within the user's customer tenancy 130. The Service-A control plane 112 can continue to control and manage the Service-A compute instance 131. However, the user 105 may not have sent an instruction to the Service-B control plane 122 to create a second compute instance for Service-B, and therefore a Service-B compute instance 132 (e.g., a substantiation of the second service) may not yet exist within the user's customer tenancy 130.

As shown in FIG. 4, processing may be initiated at S402, which can be the same as or similar to step S202 in FIG. 2, when the user 105 using a user device (e.g., console 106) sends a request to Service-A control plane 112 to attach a Service-A compute instance 131 and a Service-B compute instance 132 within the user's customer tenancy 130.

After receiving an attachment request, the dominant control plane may then initiate processing to determine if the attachment request can be performed. For example, processing may be performed to determine if the user requesting the attachment is authorized to make such a request. In certain implementations, the identity management and authorization service 140 may perform processing for the authorization. Accordingly, at S404, which can be the same as or similar to step S204 in FIG. 2, the dominant control plane (in this example, the Service-A control plane 112) may send the identity management and authorization service 140 information related to the request received in S402. The identity management and authorization service 140 may then initiate an authorization process. If the authorization is successful (i.e., the user is allowed to request attachment of two compute instances), then, as part of S404, the identity management and authorization service 140 may send a response back to the dominant control plane (i.e., Service-A control plane 112) providing authorization for the attachment processing to proceed. In some embodiments, the response sent by the identity management and authorization service 140 to the Service-A control plane 112 may include an On-Behalf-Of (OBO) token.

In implementations using asynchronous processing, at S406 which can be the same as or similar to step S206 in FIG. 2, the Service-A control plane front end 113 creates an asynchronous work request for performing the processing and provide a work request identifier to the user device (e.g., console 106). The user device (e.g., console 106) can request updates regarding the status of the attachment processing by sending the work request ID.

At S408 which can be the same as or similar to step S208 in FIG. 2, after having completed the identity management and authorization processing in step S404, the Service-A control plane front end 113 instructs the Service-A control plane workflow 114 component to initiate the workflow for creating the attachment. In some embodiments, the Service-A control plane front end 113 can provide an OBO token to the Service-A control plane workflow 114 for use in communications with Service-B control plane 122 for creating the attachment.

At S409-A, the Service-A control plane workflow 114 determines that a Service-B compute instance 132 (e.g., a substantiation of the second service) does not exist within the user's customer tenancy 130. Accordingly, it is determined that a Service-B compute instance 132 is to be created before the attachment can be created.

At S409-B, the Service-A control plane workflow 114 sends a request to the Service-B control plane 122 (i.e., the passive control plane) to create a Service-B compute instance 132 (e.g., a substantiation of the second service) within the user's customer tenancy 130. The creation request includes a payload of any suitable information associated with the creation. For example, the creation request can include identity/authorization information indicating that the Service-A control plane 112 is authorized to initiate creation of the compute instance. For example, an OBO token received by Service-A control plane 112 in S404 may be included in the request sent in S409-B.

At S409-C, the Service-B control plane 122 (i.e., the passive control plane) performs processing in response to receiving the creation request. This can include creating and configuring a Service-B compute instance 132 (e.g., a substantiation of the second service) within the user's customer tenancy 130. The Service-B control plane 122 can continue to control and manage the Service-B compute instance 132. The Service-B control plane 122 may then send a creation response to the Service-A Control Plane 112 indicating that the compute instance has been created within the user's customer tenancy 130. The response message can inform the Service-A Control Plane 112 of an instance identifier (e.g., OCID) for the Service-B compute instance 132 as well as any other suitable information. After the Service-B compute instance 132 is created, the Service-A Control Plane 112 can continue with the process for attaching two compute instances.

At S410, which can be the same as or similar to step S210 in FIG. 2, the Service-A control plane workflow 114 (i.e., the dominant control plane) sends an attachment request to the Service-B control plane 122 (i.e., the passive control plane). The attachment request informs the Service-B control plane 122 that a compute instance owned by the Service-B control plane 122 is being attached to another compute instance owned by the dominant control plane (i.e., the Service-A control plane 122). The attachment request message includes a payload of any suitable information associated with the attachment. For example, the attachment request can include identity/authorization information indicating that the Service-A control plane 112 is authorized to initiate creation of the attachment. For example, an OBO token received by Service-A control plane 112 in S404 may be included in the request sent in S410. Additionally, the attachment request can indicate the instances that are to be attached (e.g., the Service-A compute instance 131 and the Service-B compute instance 132). The compute instances may be identified using identifiers that uniquely identify the instances, for example, using their respective Oracle Cloud Identifiers (OCIDs). Additionally, the attachment request can indicate the identities of the dominant control plane and the passive control plane, as well as the corresponding dominant control plane and passive control plane.

Additionally, in certain embodiments, due to the attachment, restrictions are placed on the operations that can be performed on the passive compute instance by (a) the customer, and (b) by the passive control plane. In certain implementations, the attachment request sent in S410 can include information that indicates these restrictions. For example, the request may identify, for each of the customer and for the passive control plane, a list of one or more operations that are permitted or not permitted on the passive compute instance by the customer and/or the passive control plane due to the attachment. The request may identify a list of one or more operations that are permitted or not permitted on the passive compute instance by the customer due to the attachment. In certain implementations, for each of the customer and the passive service control plane, a list of permitted operations is provided. Any operation not specifically specified in the list is not allowed while the attachment is present. In some embodiments, the operation for deleting the passive compute instance (e.g., Service-B compute instance 132) may no longer be included in the new list of customer-permitted operations. In some embodiments, the operation to delete the attachment may only be allowed for the owner, and not the customer.

At S412, which can be the same as or similar to step S212 in FIG. 2, the Service-B control plane 122 (i.e., the passive control plane) performs processing in response to receiving the attachment request. This can include storing (also referred to as "posting") the attachment request details received from the Service-A control plane 112 (i.e., from the dominant control plane) in a record to persist the attachment information, and modifying ownership and allowed operations associated with the Service-B compute instance 132 (i.e., with the passive compute instance). In some embodiments, the Service-B control plane 122 may verify that the Service-A control plane 112 is authorized to initiate creation of the attachment. For example, the Service-B control plane 122 can verify the authenticity of an OBO token and/or permissions associated with the OBO token. In some embodiments, as part of S412, the Service-B control plane 122 may modify and configure the Service-B compute instance 132 within the customer tenancy 130 to show that an attachment exists.

At S414, which can be the same as or similar to step S214 in FIG. 2, the Service-B control plane 122 sends an attachment response to the Service-A Control Plane 112 indicating that the attachment has been processed at the Service-B control plane 122. The attachment response message can inform the Service-A Control Plane 112 that the attachment details have been acknowledged and implemented in accordance with the attachment request message sent at step S410.

Optionally, at S416, which can be the same as or similar to step S216 in FIG. 2, the Service-A Control Plane 112 (i.e., the dominant control plane) may send instructions to the Service-B control plane 122 (i.e., the passive control plane) to configure and/or update the Service-B compute instance 132 within the customer tenancy 130. For example, depending on the type of compute instance, the Service-A Control Plane 112 may install functionality (e.g., skills for a chatbot compute instance) for the Service-B compute instance 132 that enable communications between Service-B compute instance 132 and Service-A compute instance 131.

At S418, which can be the same as or similar to step S218 in FIG. 2, the Service-A Control Plane 112 (i.e., the dominant control plane) performs processing to attach the compute instances in response to receiving the attachment response from the Service-B control plane 122 (i.e., from the passive control plane). For example, the Service-A Control Plane 112 may store any suitable information in a record to persist the attachment information at the dominant control plane. This can include storing a compartment ID (e.g., within the customer tenancy 130) of the Service-B compute instance 132 as indicated by the Service-B control plane 122. Further, the Service-A Control Plane 112 can identify what allowed operations were agreed to and/or provided by the Service-B control plane 122. In some embodiments, as part of the processing performed in S418, the Service-A Control Plane 112 can perform identity wiring so that the Service-A compute instance 131 and the Service-B compute instance 132 can communicate with each other. In some embodiments, as part of the processing performed in S418, the Service-A Control Plane 112 can configure the Service-A compute instance 131 and/or the Service-B compute instance 132 to show the attachment.

At this point, both control planes have agreed to the attachment and performed processing to complete the attachment, such as storing information associated with the attachment and modifying certain permissions, ownership, and configurations. The Service-B control plane 122 (i.e., the passive control plane) has given control and ownership of the Service-B compute instance 132 (i.e., the passive compute instance) to the Service-A Control Plane 112 (i.e., the dominant control plane). As a result, the Service-A Control Plane 112 (the dominant control plane) now has control and ownership of both the Service-A compute instance 131 (i.e., the dominant compute instance) and the Service-B compute instance 132 (i.e., the passive compute instance). The Service-A compute instance 131 and the attached Service-B compute instance 132 both continue to reside within the customer tenancy 130.

At S420, which can be the same as or similar to step S220 in FIG. 2, the Service-A Control Plane Workflow 114 can send a completion message back to the Service-A Control Plane front end 113 indicating that the attachment was successfully established (or alternatively, if there was a failure). Then, at S422, which can be the same as or similar to step S222 in FIG. 2, the Service-A Control Plane front end 113 can send a completion message back to the user 105 (e.g., via the user device such as console 106) indicating that the attachment was successfully established (or indicating a failure).

As a result of the processing depicted in FIG. 4, two compute instances, from two different services operating in two different service tenancies, that are normally separate, independent, and without any dependencies or attachments can now become attached and communicate with each other, when desired by the user 105.

Figure 5:
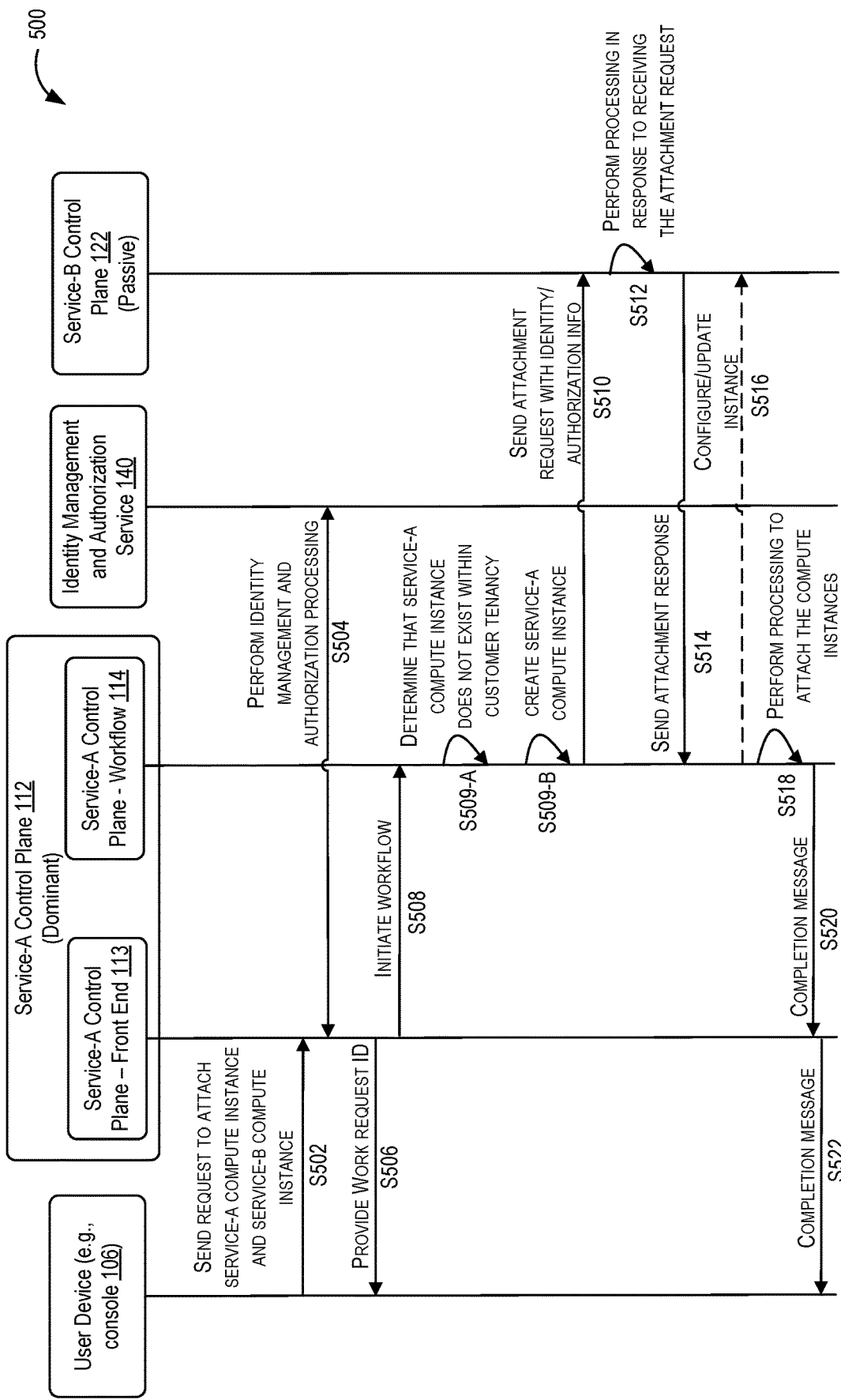
FIG. 5 depicts a simplified swimchart depicting a process for attaching two compute instances within a customer tenancy, where the dominant instance does not yet exist and is created as a part of the process, according to certain embodiments.

FIG. 5 depicts a simplified swimchart 500 depicting a process for attaching two compute instances within a customer tenancy, where the dominant instance does not yet exist and is created as a part of the process, according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel.

The swimchart 500 illustrates a process for attaching two compute instances. It is assumed for the process depicted in FIG. 5 that the passive instance to be attached already exists prior to receiving the attachment request, and that the dominant instance to be attached does not yet exist prior to receiving the attachment request. For example, the passive compute instance being attached may have been previously created prior to receiving the attachment request, but the dominant compute instance being attached has not been created prior to receiving the attachment request.

For example, in the embodiment depicted in FIG. 1, the user 105 can (e.g., via the console 106) send an instruction to the Service-B control plane 122 to create a second compute instance for Service-B. In response to receiving the user instructions, the Service-B control plane 122 can create and configure a Service-B compute instance 132 (e.g., a substantiation of the second service) within the user's customer tenancy 130. The Service-B control plane 122 can continue to control and manage the Service-B compute instance 132. However, the user 105 may not have sent an instruction to the Service-A control plane front end 113 to create a first compute instance for Service-A, and therefore a Service-A compute instance 131 (e.g., a substantiation of the first service) may not yet exist within the user's customer tenancy 130.

As shown in FIG. 5, processing may be initiated at S502, which can be the same as or similar to step S202 in FIG. 2, when the user 105 using a user device (e.g., console 106) sends a request to Service-A control plane 112 to attach a Service-A compute instance 131 and a Service-B compute instance 132 within the user's customer tenancy 130.

After receiving an attachment request, the dominant control plane may then initiate processing to determine if the attachment request can be performed. For example, processing may be performed to determine if the user requesting the attachment is authorized to make such a request. In certain implementations, the identity management and authorization service 140 may perform processing for the authorization. Accordingly, at S504, which can be the same as or similar to step S204 in FIG. 2, the dominant control plane (in this example, the Service-A control plane 112) may send the identity management and authorization service 140 information related to the request received in S502. The identity management and authorization service 140 may then initiate an authorization process. If the authorization is successful (i.e., the user is allowed to request attachment of two compute instances), then, as part of S504, the identity management and authorization service 140 may send a response back to the dominant control plane (i.e., Service-A control plane 112) providing authorization for the attachment processing to proceed. In some embodiments, the response sent by the identity management and authorization service 140 to the Service-A control plane 112 may include an On-Behalf-Of (OBO) token.

In implementations using asynchronous processing, at S506 which can be the same as or similar to step S206 in FIG. 2, the Service-A control plane front end 113 creates an asynchronous work request for performing the processing and provide a work request identifier to the user device (e.g., console 106). The user device (e.g., console 106) can request updates regarding the status of the attachment processing by sending the work request ID.

At S508 which can be the same as or similar to step S208 in FIG. 2, after having completed the identity management and authorization processing in step S504, the Service-A control plane front end 113 instructs the Service-A control plane workflow 114 component to initiate the workflow for creating the attachment. In some embodiments, the Service-A control plane front end 113 can provide an OBO token to the Service-A control plane workflow 114 for use in communications with Service-B control plane 122 for creating the attachment.

At S509-A, the Service-A control plane workflow 114 determines that a Service-A compute instance 131 (e.g., a substantiation of the first service) does not exist within the user's customer tenancy 130. Accordingly, it is determined that a Service-A compute instance 131 is to be created before the attachment can be created.

At S509-B, the Service-A control plane workflow 114 creates and configures a Service-A compute instance 131 (e.g., a substantiation of the first service) within the user's customer tenancy 130. The Service-A control plane 112 can continue to control and manage the Service-A compute instance 131. After the Service-A compute instance 131 is created, the Service-A Control Plane 112 can continue with the process for attaching two compute instances.

At S510, which can be the same as or similar to step S210 in FIG. 2, the Service-A control plane workflow 114 (i.e., the dominant control plane) sends an attachment request to the Service-B control plane 122 (i.e., the passive control plane). The attachment request informs the Service-B control plane 122 that a compute instance owned by the Service-B control plane 122 is being attached to another compute instance owned by the dominant control plane (i.e., the Service-A control plane 122). The attachment request message includes a payload of any suitable information associated with the attachment. For example, the attachment request can include identity/authorization information indicating that the Service-A control plane 112 is authorized to initiate creation of the attachment. For example, an OBO token received by Service-A control plane 112 in S504 may be included in the request sent in S510. Additionally, the attachment request can indicate the instances that are to be attached (e.g., the Service-A compute instance 131 and the Service-B compute instance 132). The compute instances may be identified using identifiers that uniquely identify the instances, for example, using their respective Oracle Cloud Identifiers (OCIDs). Additionally, the attachment request can indicate the identities of the dominant control plane and the passive control plane, as well as the corresponding dominant control plane and passive control plane.

Additionally, in certain embodiments, due to the attachment, restrictions are placed on the operations that can be performed on the passive compute instance by (a) the customer, and (b) by the passive control plane. In certain implementations, the attachment request sent in S510 can include information that indicates these restrictions. For example, the request may identify, for each of the customer and for the passive control plane, a list of one or more operations that are permitted or not permitted on the passive compute instance by the customer and/or the passive control plane due to the attachment. The request may identify a list of one or more operations that are permitted or not permitted on the passive compute instance by the customer due to the attachment. In certain implementations, for each of the customer and the passive service control plane, a list of permitted operations is provided. Any operation not specifically specified in the list is not allowed while the attachment is present. In some embodiments, the operation for deleting the passive compute instance (e.g., Service-B compute instance 132) may no longer be included in the new list of customer-permitted operations. In some embodiments, the operation to delete the attachment may only be allowed for the owner, and not the customer.

At S512, which can be the same as or similar to step S212 in FIG. 2, the Service-B control plane 122 (i.e., the passive control plane) performs processing in response to receiving the attachment request. This can include storing (also referred to as "posting") the attachment request details received from the Service-A control plane 112 (i.e., from the dominant control plane) in a record to persist the attachment information, and modifying ownership and allowed operations associated with the Service-B compute instance 132 (i.e., with the passive compute instance). In some embodiments, the Service-B control plane 122 may verify that the Service-A control plane 112 is authorized to initiate creation of the attachment. For example, the Service-B control plane 122 can verify the authenticity of an OBO token and/or permissions associated with the OBO token. In some embodiments, as part of S512, the Service-B control plane 122 may modify and configure the Service-B compute instance 132 within the customer tenancy 130 to show that an attachment exists.

At S514, which can be the same as or similar to step S214 in FIG. 2, the Service-B control plane 122 sends an attachment response to the Service-A Control Plane 112 indicating that the attachment has been processed at the Service-B control plane 122. The attachment response message can inform the Service-A Control Plane 112 that the attachment details have been acknowledged and implemented in accordance with the attachment request message sent at step S510.

Optionally, at S516, which can be the same as or similar to step S216 in FIG. 2, the Service-A Control Plane 112 (i.e., the dominant control plane) may send instructions to the Service-B control plane 122 (i.e., the passive control plane) to configure and/or update the Service-B compute instance 132 within the customer tenancy 130. For example, depending on the type of compute instance, the Service-A Control Plane 112 may install functionality (e.g., skills for a chatbot compute instance) for the Service-B compute instance 132 that enable communications between Service-B compute instance 132 and Service-A compute instance 131.

At S518, which can be the same as or similar to step S218 in FIG. 2, the Service-A Control Plane 112 (i.e., the dominant control plane) performs processing to attach the compute instances in response to receiving the attachment response from the Service-B control plane 122 (i.e., from the passive control plane). For example, the Service-A Control Plane 112 may store any suitable information in a record to persist the attachment information at the dominant control plane. This can include storing a compartment ID (e.g., within the customer tenancy 130) of the Service-B compute instance 132 as indicated by the Service-B control plane 122. Further, the Service-A Control Plane 112 can identify what allowed operations were agreed to and/or provided by the Service-B control plane 122. In some embodiments, as part of the processing performed in S518, the Service-A Control Plane 112 can perform identity wiring so that the Service-A compute instance 131 and the Service-B compute instance 132 can communicate with each other. In some embodiments, as part of the processing performed in S518, the Service-A Control Plane 112 can configure the Service-A compute instance 131 and/or the Service-B compute instance 132 to show the attachment.

At this point, both control planes have agreed to the attachment and performed processing to complete the attachment, such as storing information associated with the attachment and modifying certain permissions, ownership, and configurations. The Service-B control plane 122 (i.e., the passive control plane) has given control and ownership of the Service-B compute instance 132 (i.e., the passive compute instance) to the Service-A Control Plane 112 (i.e., the dominant control plane). As a result, the Service-A Control Plane 112 (the dominant control plane) now has control and ownership of both the Service-A compute instance 131 (i.e., the dominant compute instance) and the Service-B compute instance 132 (i.e., the passive compute instance). The Service-A compute instance 131 and the attached Service-B compute instance 132 both continue to reside within the customer tenancy 130.

At S520, which can be the same as or similar to step S220 in FIG. 2, the Service-A Control Plane Workflow 114 can send a completion message back to the Service-A Control Plane front end 113 indicating that the attachment was successfully established (or alternatively, if there was a failure). Then, at S522, which can be the same as or similar to step S222 in FIG. 2, the Service-A Control Plane front end 113 can send a completion message back to the user 105 (e.g., via the user device such as console 106) indicating that the attachment was successfully established (or indicating a failure).

As a result of the processing depicted in FIG. 5, two compute instances, from two different services operating in two different service tenancies, that are normally separate, independent, and without any dependencies or attachments can now become attached and communicate with each other, when desired by the user 105.

Figure 6:
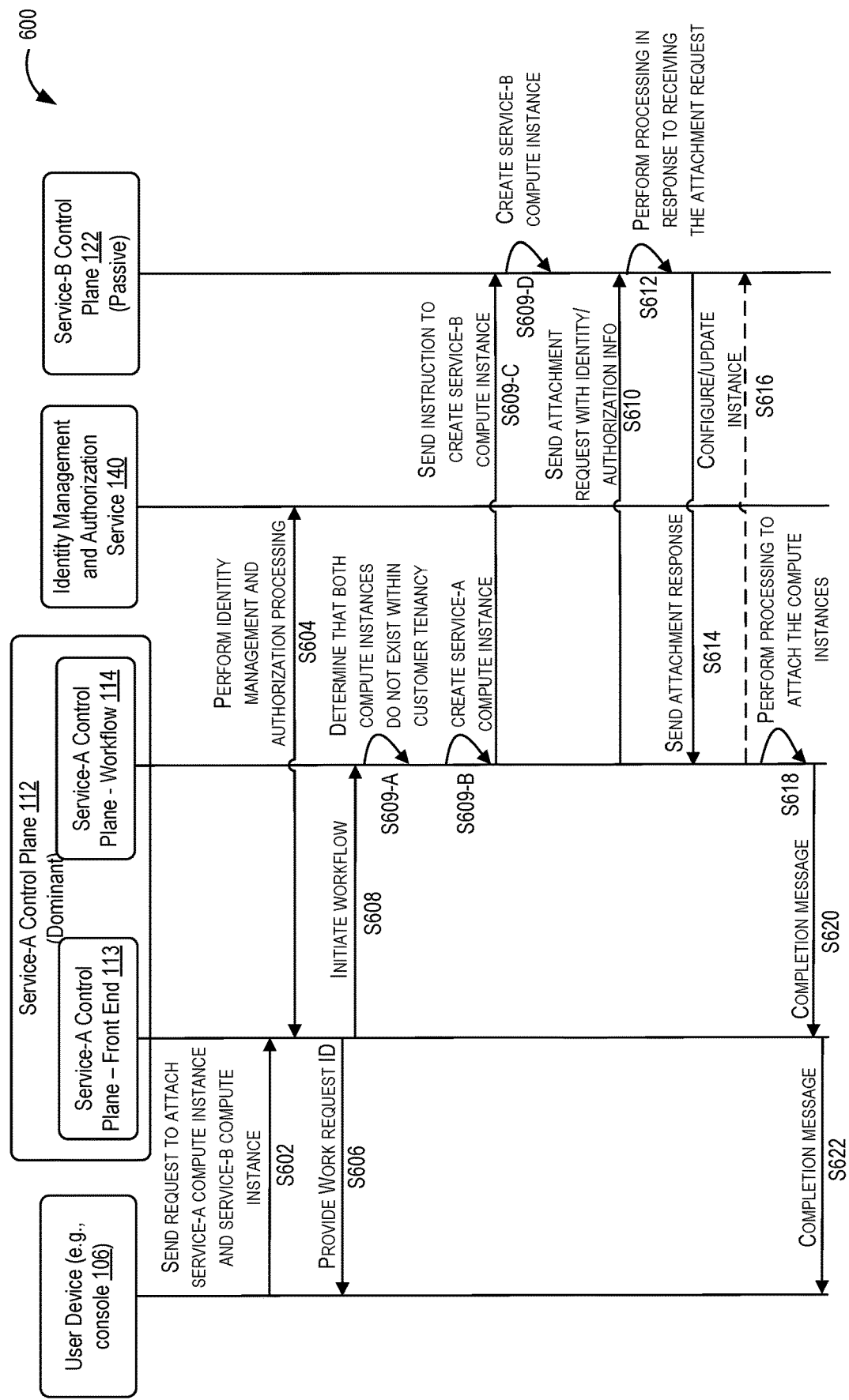
FIG. 6 depicts a simplified swimchart depicting a process for attaching two compute instances within a customer tenancy, where both of the two compute instances do not yet exist but are created as a part of the process, according to certain embodiments.

FIG. 6 depicts a simplified swimchart 600 depicting a process for attaching two compute instances within a customer tenancy, where both of the two compute instances do not yet exist and are created as a part of the process, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel.

The swimchart 600 illustrates a process for attaching two compute instances. It is assumed for the process depicted in FIG. 6 that the dominant instance to be attached does not exist prior to receiving the attachment request, and that the passive instance to be attached also does not yet exist prior to receiving the attachment request. For example, both the dominant compute and the passive compute instance being attached have not been created prior to receiving the attachment request.

For example, in the embodiment depicted in FIG. 1, the user 105 (e.g., via the console 106) may not have sent an instruction to the Service-A control plane front end 113 to create a first compute instance for Service-A, and therefore a Service-A compute instance 131 (e.g., a substantiation of the first service) may not yet exist within the user's customer tenancy 130. Also, the user 105 may not have sent an instruction to the Service-B control plane 122 to create a second compute instance for Service-B, and therefore a Service-B compute instance 132 (e.g., a substantiation of the second service) may not yet exist within the user's customer tenancy 130.

As shown in FIG. 6, processing may be initiated at S602, which can be the same as or similar to step S202 in FIG. 2, when the user 105 using a user device (e.g., console 106) sends a request to Service-A control plane 112 to attach a Service-A compute instance 131 and a Service-B compute instance 132 within the user's customer tenancy 130.

After receiving an attachment request, the dominant control plane may then initiate processing to determine if the attachment request can be performed. For example, processing may be performed to determine if the user requesting the attachment is authorized to make such a request. In certain implementations, the identity management and authorization service 140 may perform processing for the authorization. Accordingly, at S604, which can be the same as or similar to step S204 in FIG. 2, the dominant control plane (in this example, the Service-A control plane 112) may send the identity management and authorization service 140 information related to the request received in S602. The identity management and authorization service 140 may then initiate an authorization process. If the authorization is successful (i.e., the user is allowed to request attachment of two compute instances), then, as part of S604, the identity management and authorization service 140 may send a response back to the dominant control plane (i.e., Service-A control plane 112) providing authorization for the attachment processing to proceed. In some embodiments, the response sent by the identity management and authorization service 140 to the Service-A control plane 112 may include an On-Behalf-Of (OBO) token.

In implementations using asynchronous processing, at S606 which can be the same as or similar to step S206 in FIG. 2, the Service-A control plane front end 113 creates an asynchronous work request for performing the processing and provide a work request identifier to the user device (e.g., console 106). The user device (e.g., console 106) can request updates regarding the status of the attachment processing by sending the work request ID.

At S608 which can be the same as or similar to step S208 in FIG. 2, after having completed the identity management and authorization processing in step S604, the Service-A control plane front end 113 instructs the Service-A control plane workflow 114 component to initiate the workflow for creating the attachment. In some embodiments, the Service-A control plane front end 113 can provide an OBO token to the Service-A control plane workflow 114 for use in communications with Service-B control plane 122 for creating the attachment.

At S609-A, the Service-A control plane workflow 114 determines that a Service-A compute instance 131 (e.g., a substantiation of the first service) and a Service-B compute instance 132 (e.g., a substantiation of the second service) both do not exist within the user's customer tenancy 130. Accordingly, it is determined that a Service-A compute instance 131 and a Service-B compute instance 132 are to be created before the attachment can be created.

At S609-B, the Service-A control plane workflow 114 creates and configures a Service-A compute instance 131 (e.g., a substantiation of the first service) within the user's customer tenancy 130. The Service-A control plane 112 can continue to control and manage the Service-A compute instance 131.

At S609-C, the Service-A control plane workflow 114 sends a request to the Service-B control plane 122 (i.e., the passive control plane) to create a Service-B compute instance 132 (e.g., a substantiation of the second service) within the user's customer tenancy 130. The creation request includes a payload of any suitable information associated with the creation. For example, the creation request can include identity/authorization information indicating that the Service-A control plane 112 is authorized to initiate creation of the compute instance. For example, an OBO token received by Service-A control plane 112 in S604 may be included in the request sent in S609-C.

At S609-D, the Service-B control plane 122 (i.e., the passive control plane) performs processing in response to receiving the creation request. This can include creating and configuring a Service-B compute instance 132 (e.g., a substantiation of the second service) within the user's customer tenancy 130. The Service-B control plane 122 can continue to control and manage the Service-B compute instance 132. The Service-B control plane 122 may then send a creation response to the Service-A Control Plane 112 indicating that the compute instance has been created within the user's customer tenancy 130. The response message can inform the Service-A Control Plane 112 of an instance identifier (e.g., OCID) for the Service-B compute instance 132 as well as any other suitable information. After the Service-A compute instance 131 and the Service-B compute instance 132 are created, the Service-A Control Plane 112 can continue with the process for attaching two compute instances.

At S610, which can be the same as or similar to step S210 in FIG. 2, the Service-A control plane workflow 114 (i.e., the dominant control plane) sends an attachment request to the Service-B control plane 122 (i.e., the passive control plane). The attachment request informs the Service-B control plane 122 that a compute instance owned by the Service-B control plane 122 is being attached to another compute instance owned by the dominant control plane (i.e., the Service-A control plane 122). The attachment request message includes a payload of any suitable information associated with the attachment. For example, the attachment request can include identity/authorization information indicating that the Service-A control plane 112 is authorized to initiate creation of the attachment. For example, an OBO token received by Service-A control plane 112 in S604 may be included in the request sent in S610. Additionally, the attachment request can indicate the instances that are to be attached (e.g., the Service-A compute instance 131 and the Service-B compute instance 132). The compute instances may be identified using identifiers that uniquely identify the instances, for example, using their respective Oracle Cloud Identifiers (OCIDs). Additionally, the attachment request can indicate the identities of the dominant control plane and the passive control plane, as well as the corresponding dominant control plane and passive control plane.

Additionally, in certain embodiments, due to the attachment, restrictions are placed on the operations that can be performed on the passive compute instance by (a) the customer, and (b) by the passive control plane. In certain implementations, the attachment request sent in S610 can include information that indicates these restrictions. For example, the request may identify, for each of the customer and for the passive control plane, a list of one or more operations that are permitted or not permitted on the passive compute instance by the customer and/or the passive control plane due to the attachment. The request may identify a list of one or more operations that are permitted or not permitted on the passive compute instance by the customer due to the attachment. In certain implementations, for each of the customer and the passive service control plane, a list of permitted operations is provided. Any operation not specifically specified in the list is not allowed while the attachment is present. In some embodiments, the operation for deleting the passive compute instance (e.g., Service-B compute instance 132) may no longer be included in the new list of customer-permitted operations. In some embodiments, the operation to delete the attachment may only be allowed for the owner, and not the customer.

At S612, which can be the same as or similar to step S212 in FIG. 2, the Service-B control plane 122 (i.e., the passive control plane) performs processing in response to receiving the attachment request. This can include storing (also referred to as "posting") the attachment request details received from the Service-A control plane 112 (i.e., from the dominant control plane) in a record to persist the attachment information, and modifying ownership and allowed operations associated with the Service-B compute instance 132 (i.e., with the passive compute instance). In some embodiments, the Service-B control plane 122 may verify that the Service-A control plane 112 is authorized to initiate creation of the attachment. For example, the Service-B control plane 122 can verify the authenticity of an OBO token and/or permissions associated with the OBO token. In some embodiments, as part of S612, the Service-B control plane 122 may modify and configure the Service-B compute instance 132 within the customer tenancy 130 to show that an attachment exists.

At S614, which can be the same as or similar to step S214 in FIG. 2, the Service-B control plane 122 sends an attachment response to the Service-A Control Plane 112 indicating that the attachment has been processed at the Service-B control plane 122. The attachment response message can inform the Service-A Control Plane 112 that the attachment details have been acknowledged and implemented in accordance with the attachment request message sent at step S610.

Optionally, at S616, which can be the same as or similar to step S216 in FIG. 2, the Service-A Control Plane 112 (i.e., the dominant control plane) may send instructions to the Service-B control plane 122 (i.e., the passive control plane) to configure and/or update the Service-B compute instance 132 within the customer tenancy 130. For example, depending on the type of compute instance, the Service-A Control Plane 112 may install functionality (e.g., skills for a chatbot compute instance) for the Service-B compute instance 132 that enable communications between Service-B compute instance 132 and Service-A compute instance 131.

At S618, which can be the same as or similar to step S218 in FIG. 2, the Service-A Control Plane 112 (i.e., the dominant control plane) performs processing to attach the compute instances in response to receiving the attachment response from the Service-B control plane 122 (i.e., from the passive control plane). For example, the Service-A Control Plane 112 may store any suitable information in a record to persist the attachment information at the dominant control plane. This can include storing a compartment ID (e.g., within the customer tenancy 130) of the Service-B compute instance 132 as indicated by the Service-B control plane 122. Further, the Service-A Control Plane 112 can identify what allowed operations were agreed to and/or provided by the Service-B control plane 122. In some embodiments, as part of the processing performed in S618, the Service-A Control Plane 112 can perform identity wiring so that the Service-A compute instance 131 and the Service-B compute instance 132 can communicate with each other. In some embodiments, as part of the processing performed in S618, the Service-A Control Plane 112 can configure the Service-A compute instance 131 and/or the Service-B compute instance 132 to show the attachment.

At this point, both control planes have agreed to the attachment and performed processing to complete the attachment, such as storing information associated with the attachment and modifying certain permissions, ownership, and configurations. The Service-B control plane 122 (i.e., the passive control plane) has given control and ownership of the Service-B compute instance 132 (i.e., the passive compute instance) to the Service-A Control Plane 112 (i.e., the dominant control plane). As a result, the Service-A Control Plane 112 (the dominant control plane) now has control and ownership of both the Service-A compute instance 131 (i.e., the dominant compute instance) and the Service-B compute instance 132 (i.e., the passive compute instance). The Service-A compute instance 131 and the attached Service-B compute instance 132 both continue to reside within the customer tenancy 130.

At S620, which can be the same as or similar to step S220 in FIG. 2, the Service-A Control Plane Workflow 114 can send a completion message back to the Service-A Control Plane front end 113 indicating that the attachment was successfully established (or alternatively, if there was a failure). Then, at S622, which can be the same as or similar to step S222 in FIG. 2, the Service-A Control Plane front end 113 can send a completion message back to the user 105 (e.g., via the user device such as console 106) indicating that the attachment was successfully established (or indicating a failure).

As a result of the processing depicted in FIG. 6, two compute instances, from two different services operating in two different service tenancies, that are normally separate, independent, and without any dependencies or attachments can now become attached and communicate with each other, when desired by the user 105.

In some embodiments, an embedded compute instance may be automatically attached without any user instructions or user involvement. For example, the process illustrated in FIG. 2 can take place without step S202. In other words, the Service-B compute instance 132 can be automatically attached to the Service-A compute instance 131 automatically and without a specific user request. This automatic attachment process may take place in embodiments where the Service-B control plane 122 and/or the Service-B compute instance 132 are hidden from the user device (e.g., console 106), so that the user device (e.g., console 106) cannot view or access the Service-B control plane 122 and/or the Service-B compute instance 132. In this case, the Service-B compute instance 132 may be created outside of the user's customer tenancy 130, and may instead by created within a Service-B control plane 122.

As described above, in certain embodiments, due to an attachment, restrictions are placed on the operations that can be performed on a passive compute instance.

Figure 7:
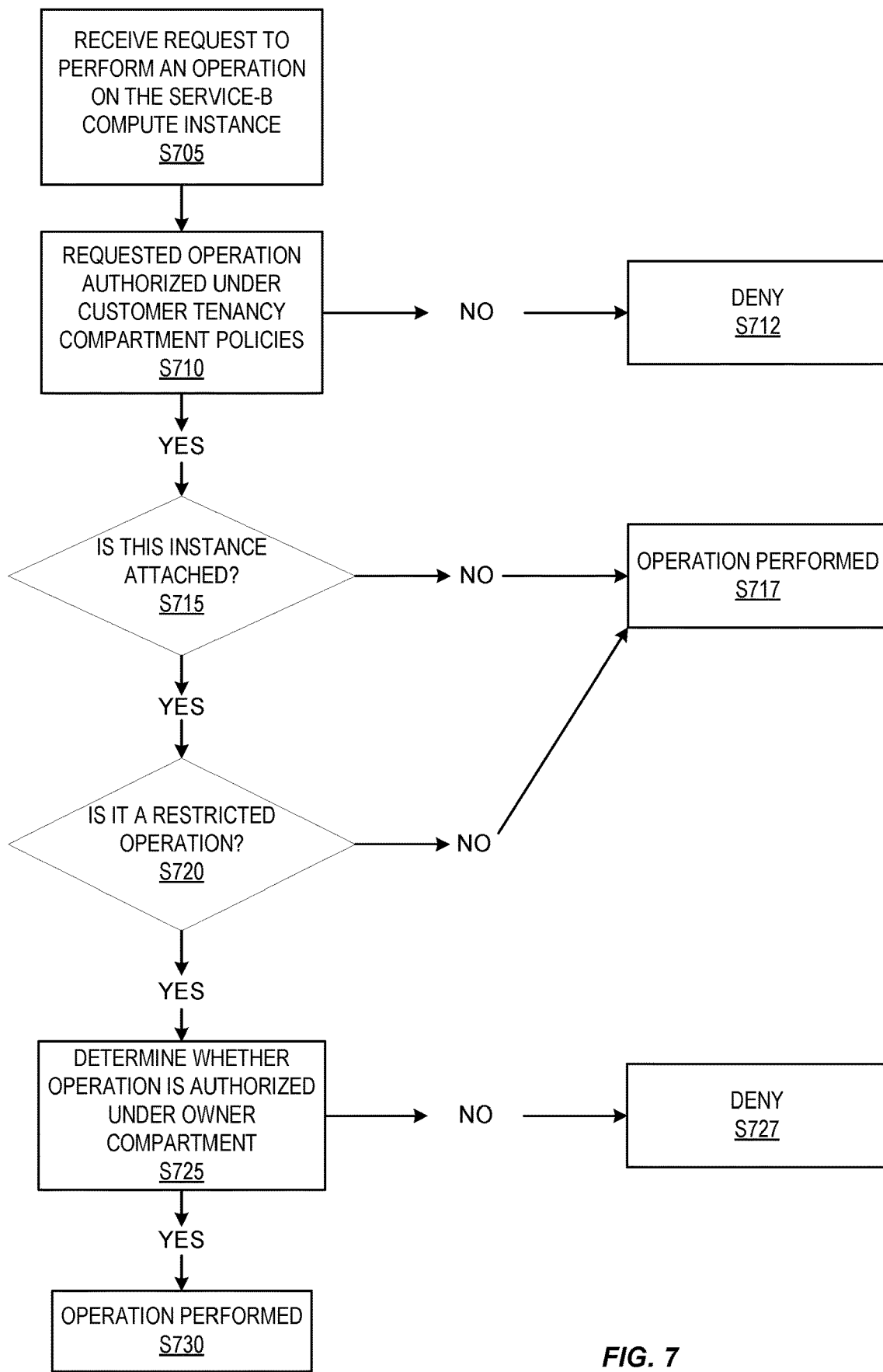
FIG. 7 depicts a process for determining whether an operation is permitted, according to certain embodiments.

FIG. 7 depicts a process 700 for determining whether an operation is permitted, according to certain embodiments. The processing depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order or some steps may also be performed in parallel. For the processing described in FIG. 7, Service-A compute instance 131 is assumed to be the dominant compute instance and the Service-B compute instance 132, which is attached to the Service-A compute instance 131, is the passive compute instance. Accordingly, the Service-A control plane 112 is the dominant control plane and the Service-B control plane 122 is the passive control plane.

For example, referring to FIG. 1, a user 105, other than the dominant control plane, may wish to perform an operation on the passive instance (e.g., Service-B compute instance 132) that is within the customer tenancy 130. As an example, the user 105 may wish to delete the passive instance (e.g., Service-B compute instance 132) within the customer tenancy 130. Accordingly, the user device (e.g., console 106) may submit a request to perform the operation (e.g., deletion) on the passive instance (e.g., Service-B compute instance 132).

In some embodiments, this request is received by the service control plane that owns the passive instance (e.g., Service-B compute instance 132). As described above, due to an attachment, the owner of the passive instance (e.g., Service-B compute instance 132) may be the dominant control plane (e.g., Service-A control plane 112).

Accordingly, the processing FIG. 7 is initiated when, at step S705, the Dominant control plane (e.g., Service-A control plane 112) receives the request to perform the operation on the passive instance (e.g., Service-B compute instance 132) within the customer tenancy 130. For purposes of example, the request is a deletion request to delete the passive instance (e.g., Service-B compute instance 132) within the customer tenancy 130. After receiving the request, the Dominant control plane (e.g., Service-A control plane 112) will then invoke the IDMAS 140 to perform a number of checks to determine whether the operation is permitted.

The Passive instance (e.g., Service-B compute instance 132) sits in the customer tenancy 130 and is also owned by the dominant tenancy (e.g., Service-A tenancy 115) since the Dominant control plane (e.g., Service-A control plane 112) owns the passive instance after an attachment. A first authorization check is performed to see if the requested operation on Passive instance (e.g., Service-B compute instance 132) is allowed based upon policies associated with customer tenancy 130. Accordingly, at step S710, the Dominant control plane (e.g., Service-A control plane 112) calls the IDMAS 140, and the IDMAS 140 determines whether the requested operation (e.g., deleting the Passive instance) is authorized based on policies and permissions associated with or configured for the customer compartment.

In certain implementations, as part of the processing in S710, the customer tenancy compartment identifier associated with the passive compute instance (e.g., Service-B compute instance 132) is used to identify the specific customer tenancy compartment and the one or more policies associated with that compartment. The policies are then evaluated to determine if the requested operation is authorized by the compartment policies. For example, the compartment of the user's customer tenancy 130 may have associated one or more policies identifying a list of authorized operations that can be performed on compute instances within that compartment. If the requested operation is specified as an allowed operation in the list of authorized operations, then the requested operation is deemed to be authorized, else not authorized.

In some embodiments, the customer tenancy 130 may comprise a hierarchy of nodes representing compartments, where the hierarchy may be represented by a hierarchy tree with the root compartment located at the head of the tree. In certain implementations, the hierarchy may represent a containment relationship. In such an implementation, one or more policies may be associated with individual compartment in the hierarchy. The processing performed by the IDMAS 140 in S710 may involve first identifying the specific compartment in the hierarchy that contains the passive instance (e.g., Service-B compute instance 132) and identifying any policies associated with that compartment. Then, starting from the specific compartment containing the Passive instance (e.g., Service-B compute instance 132), the hierarchy tree is walked up to the root compartment node. All the policies associated with the compartment that are include in the walk up to the root compartment are determined. As part of the processing in S710, the one or more policies, if any, associated with specific compartment containing the Passive instance (e.g., Service-B compute instance 132), as well as policies identified from walking/traversing the hierarchy tree from the specific compartment to the root compartment are analyzed to determine if the operation requested in the request received in S705 is authorized.

The IDMAS 140 can thereby determine whether the requested operation (e.g., deleting the Passive instance) is authorized or permitted, and send a response to the Dominant control plane (e.g., Service-A control plane 112) with the results.

If the Dominant control plane (e.g., Service-A control plane 112) is informed that the requested operation (e.g., deleting the Passive instance) is authorized or permitted (i.e., the authorization check is passed), then the Dominant control plane (e.g., Service-A control plane 112) may proceed to step S715 for additional processing. If the Dominant control plane (e.g., Service-A control plane 112) is informed that the requested operation (e.g., deleting the Passive instance) is not permitted (i.e., the authorization check fails), then the Dominant control plane (e.g., Service-A control plane 112) may deny the operation from being performed at step S712, and the process may end with the request to perform the operation being rejected.

At step S715, the Dominant control plane (e.g., Service-A control plane 112) determines whether the Passive instance (e.g., Service-B compute instance 132) is attached to another compute instance. If there is an attachment, then additional authorization checks are performed.

Accordingly, if the Dominant control plane (e.g., Service-A control plane 112) determines in S715 that Passive instance (e.g., Service-B compute instance 132) is part of an attachment, i.e., is attached to another compute instance, then processing continues with S720 wherein additional checks are performed. If the Dominant control plane (e.g., Service-A control plane 112) determines in S715 that no attachment exists between the Passive instance and another compute instance (i.e., Passive instance is not involved in an attachment), then processing continues with S717, where the requested operation is allowed to be performed on the Passive instance (e.g., Service-B compute instance 132), and processing then ends. For example, if the requested operation is to delete the Passive instance, then the Passive instance is deleted.

Accordingly, at step S720, the Dominant control plane (e.g., Service-A control plane 112) determines whether the requested operation (e.g., deleting the Passive instance) is a restricted based upon a stored list of allowed customer operations associated with the attachment. These allowed customer operations can be stored at the Dominant control plane (e.g., Service-A control plane 112) and/or the passive control plane (e.g., Service-B control plane 122) as associated with the attachment. The allowed customer operations list can be referred to as a dual authorization list, because if an operation is included in the list, then it is a restricted operation that requires dual authorization. If an operation is not included in the list, then dual authorization is not required, it is not a restricted operation, and the initial authorization (e.g., at step S710) is considered sufficient. In order to check the list, the Dominant control plane (e.g., Service-A control plane 112) calls the passive control plane (e.g., Service-B control plane 122), which then checks the list for that operation, and then returns the results to the Dominant control plane (e.g., Service-A control plane 112)

If the Dominant control plane (e.g., Service-A control plane 112) is informed by the passive control plane (e.g., Service-B control plane 122) in S720 that the operation is included in the list and therefore is a restricted operation, then processing continues with S725 wherein additional checks are performed. If the Dominant control plane (e.g., Service-A control plane 112) is informed by the passive control plane (e.g., Service-B control plane 122) in S720 that the operation is not included in the list and therefore is not a restricted operation, the processing continues with S717, where the requested operation is allowed to be performed on the Passive instance (e.g., Service-B compute instance 132), and processing then ends. For example, if the requested operation is to delete the Passive instance, then the Passive instance is deleted.

As described above, the attached Passive instance (e.g., Service-B compute instance 132) sits in both the customer tenancy 130 is also owned by the dominant tenancy (e.g., Service-A tenancy 115). Processing is then performed to see if the requesting user is permitted to perform the requested operation on Passive instance (e.g., Service-B compute instance 132) based upon policies associated with the dominant tenancy (e.g., Service-A tenancy 115).

Accordingly, at step S725, the Dominant control plane (e.g., Service-A control plane 112) calls the IDMAS 140, and the IDMAS 140 determines whether the requested operation (e.g., deleting the Passive instance) is permitted or authorized based upon policies associated with the dominant tenancy (e.g., Service-A tenancy 115) or based upon attachment-related metadata stored for the dominant tenancy or control plane that identifies operations that are permitted on Passive instance (e.g., Service-B compute instance 132).

For example, as described above, when an attachment is performed, both the Dominant control plane (e.g., Service-A control plane 112) and the passive control plane (e.g., Service-B control plane 122) persist or store information about the attachment (e.g., about the dominant instance and passive instance attachment). This stored information or record may include a list of operations that can be performed on the passive compute instance by the customer, and a list of operations that can be performed on the passive compute instance by the owner (e.g., the dominant control plane) while the attachment exists. If an operation is not included in this list, then that operation is not allowed and cannot be performed by the requesting user. In certain implementations, information identifying the allowed list of operations may be stored in the form of an access control list (ACL), which describes what access rights a user has for a resource.

As part of S725, the IDMAS 140 checks if the operation requested by the requesting user to be performed on the passive compute instance is included in the allowed list of operations based upon information stored by the dominant control plane. For example, in the embodiment depicted in FIG. 1, the IDMAS 140 checks if the operation requested by the requesting user on Passive instance (e.g., Service-B compute instance 132) is included in the allowed list of operations that can be performed by the owner (e.g., dominant control plane) based upon information stored by Dominant control plane (e.g., Service-A control plane 112).

The IDMAS 140 can thereby perform a second authorization to determine whether the requested operation (e.g., deleting the Passive instance) is authorized or permitted based upon policies associated with the dominant tenancy (e.g., Service-A tenancy 115). The IDMAS 140 can then send a response to the Dominant control plane (e.g., Service-A control plane 112) with the results of the second authorization.

If the Dominant control plane (e.g., Service-A control plane 112) is informed that the requested operation (e.g., deleting the Passive instance) is authorized based on the list of authorized operations in the attachment-related information and/or an ACL stored by the Dominant control plane, then processing continues with S730, where the requested operation is allowed to be performed on the Passive instance (e.g., Service-B compute instance 132), and processing then ends. For example, if the requested operation is to delete the Passive instance, then Passive instance is deleted.

If the Dominant control plane (e.g., Service-A control plane 112) is informed that the requested operation (e.g., deleting the Passive instance) is not in the list of authorized operations indicated in the attachment-related information stored by Dominant control plane and/or an ACL associated with Dominant control plane, then the Dominant control plane (e.g., Service-A control plane 112) may deny the operation from being performed at step S727, and the process may end with the request to perform the operation being rejected.

In some embodiments, the steps of FIG. 7 can be intentionally designed to prevent certain operations from taking place while an attachment exists. For example, an attachment may cause the Passive instance (e.g., Service-B compute instance 132) to be under the ownership of the Dominant control plane (e.g., Service-A control plane 112), but it may be undesirable to allow the Dominant control plane (e.g., Service-A control plane 112) to perform one or more operations. One way to prevent the Dominant control plane (e.g., Service-A control plane 112) from performing certain operations on the Passive instance (e.g., Service-B compute instance 132) would be include a list of operations that are explicitly not allowed. However, current systems use lists of operations that are allowed (with non-listed operations being not allowed), and it is preferred to work with these existing frameworks. Accordingly, layered polices can be utilized as described above with respect to FIG. 7. A first policy may allow an operation (e.g., the customer compartment policy in step S710), but then a second policy is to be checked when an attachment exists, and the second policy may not allow the operation (e.g., the owner compartment policy in step S725). The owner compartment policy can be designed to include a limited set operations, such that certain operation requests will fail (e.g., when checking the owner compartment policy in step S725). For example, it may be desired to disallow the deletion operation, and the request to delete the Passive instance (e.g., Service-B compute instance 132) will fail at step S725.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
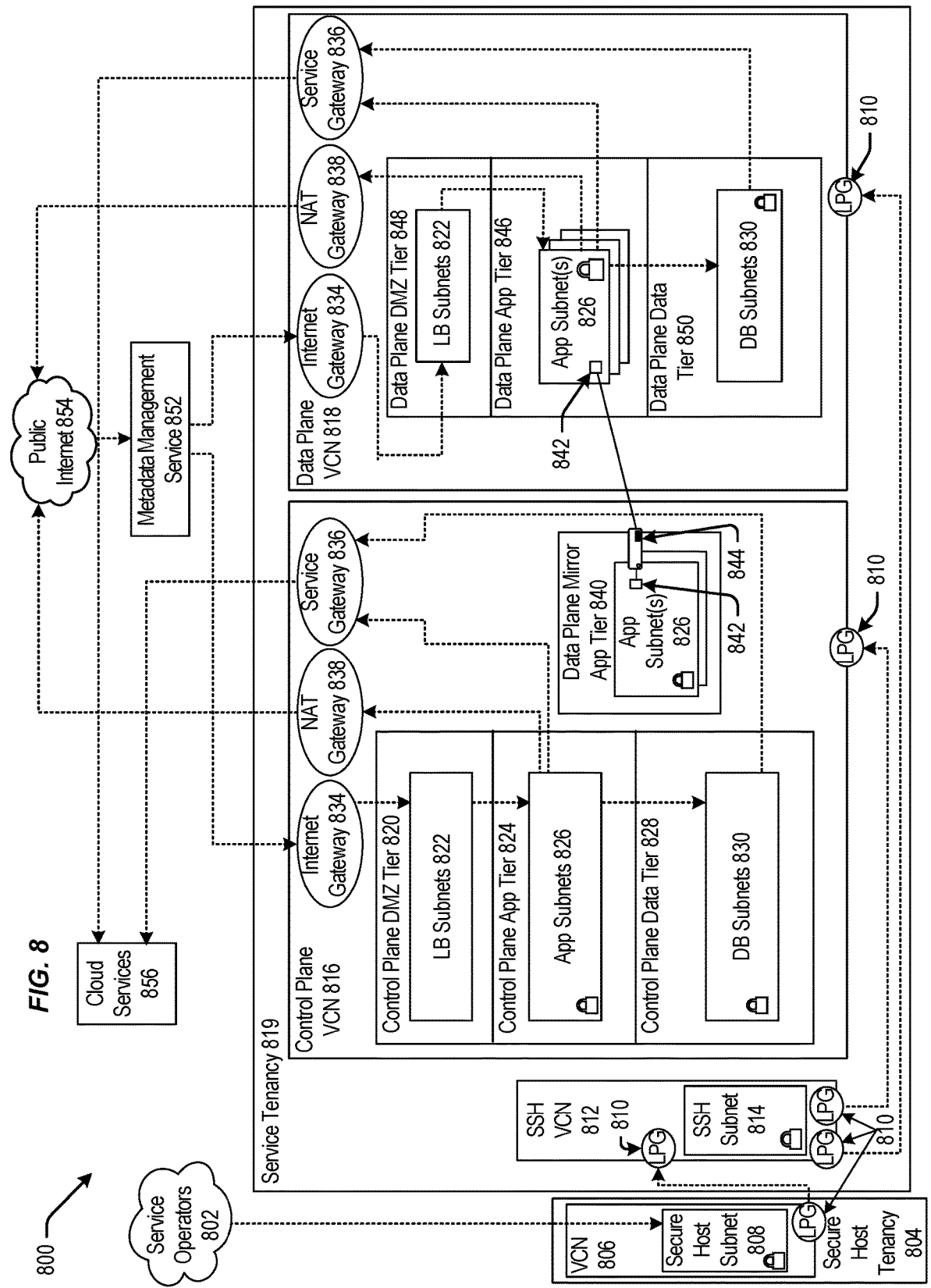
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
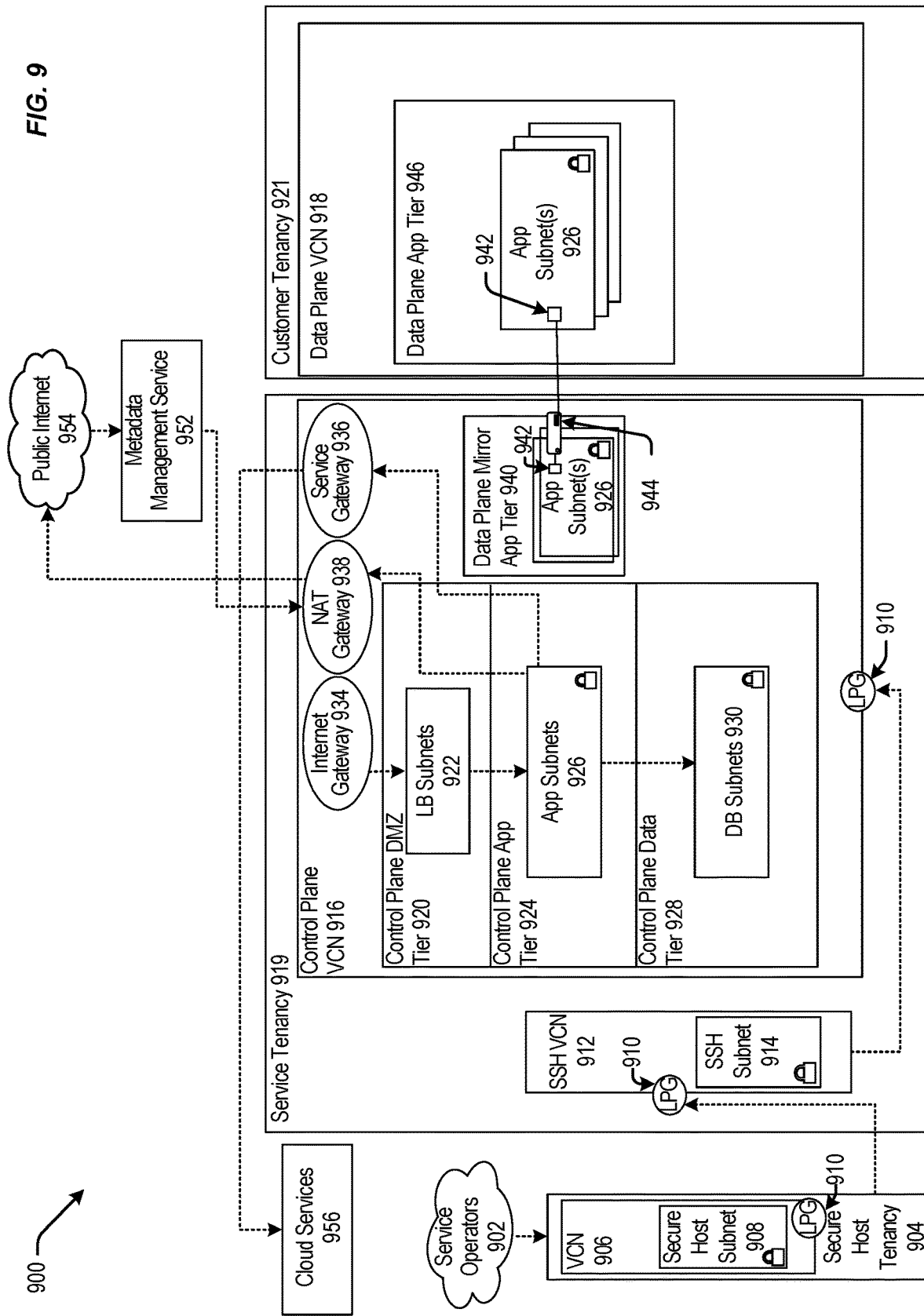
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
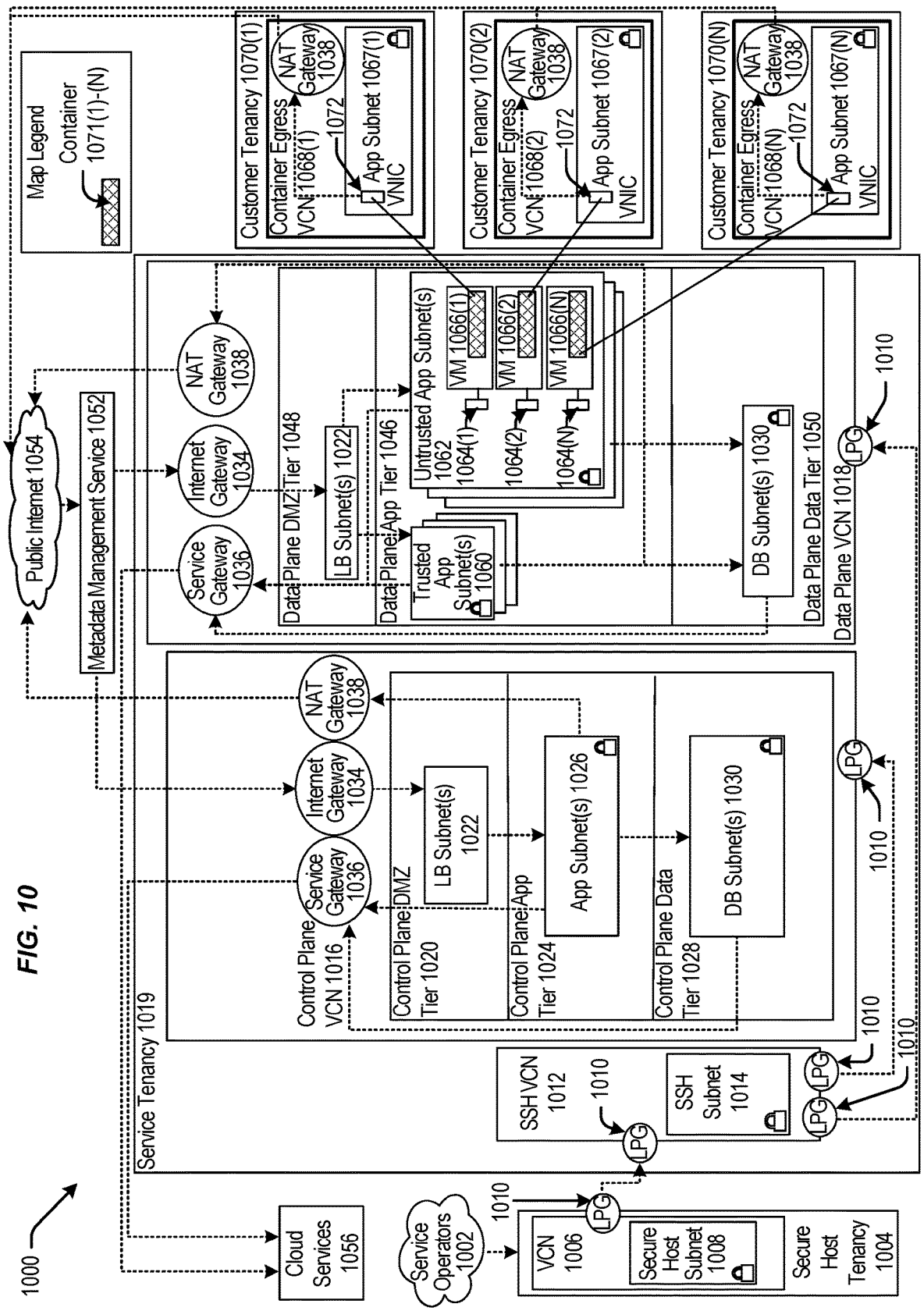
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
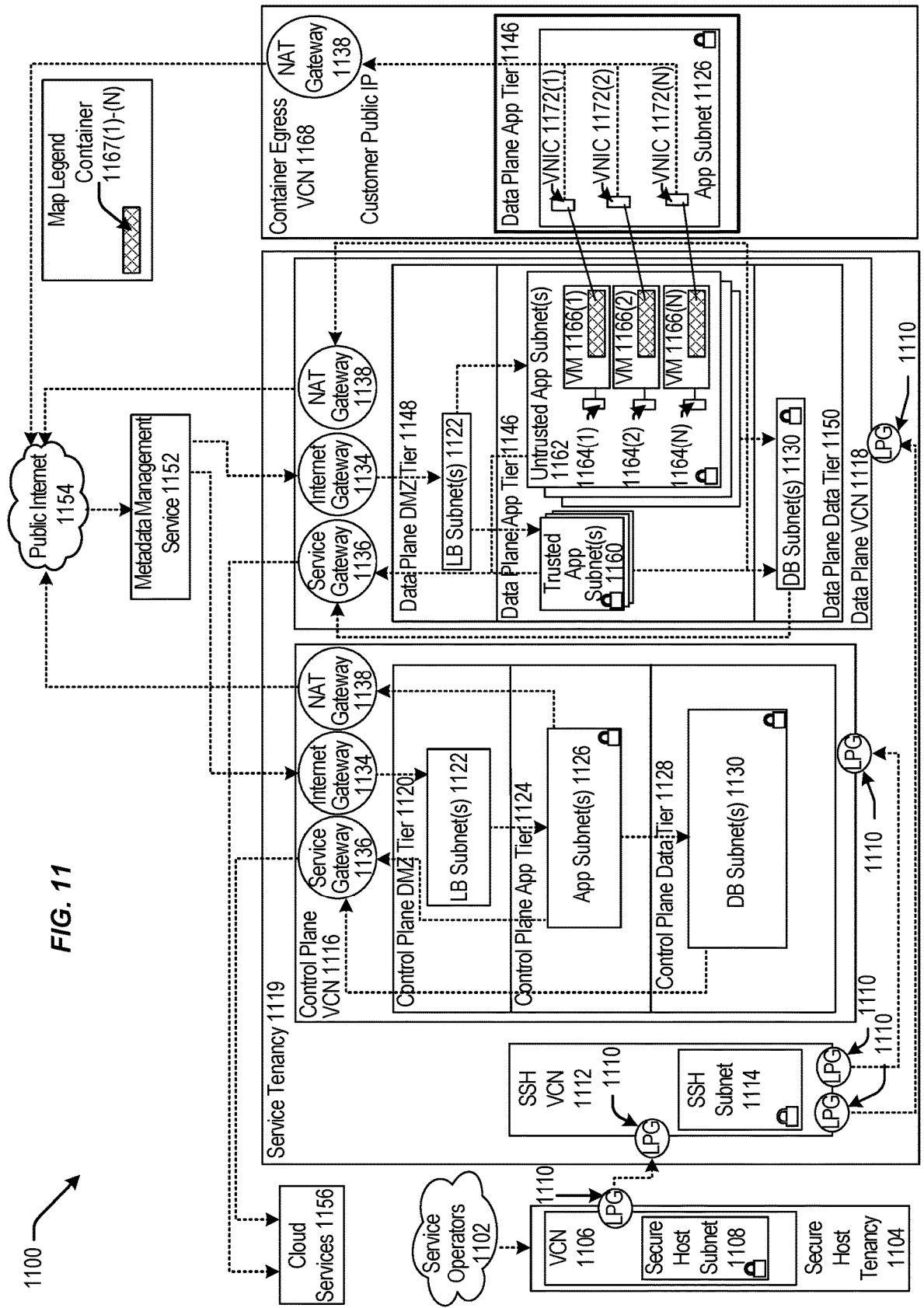
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
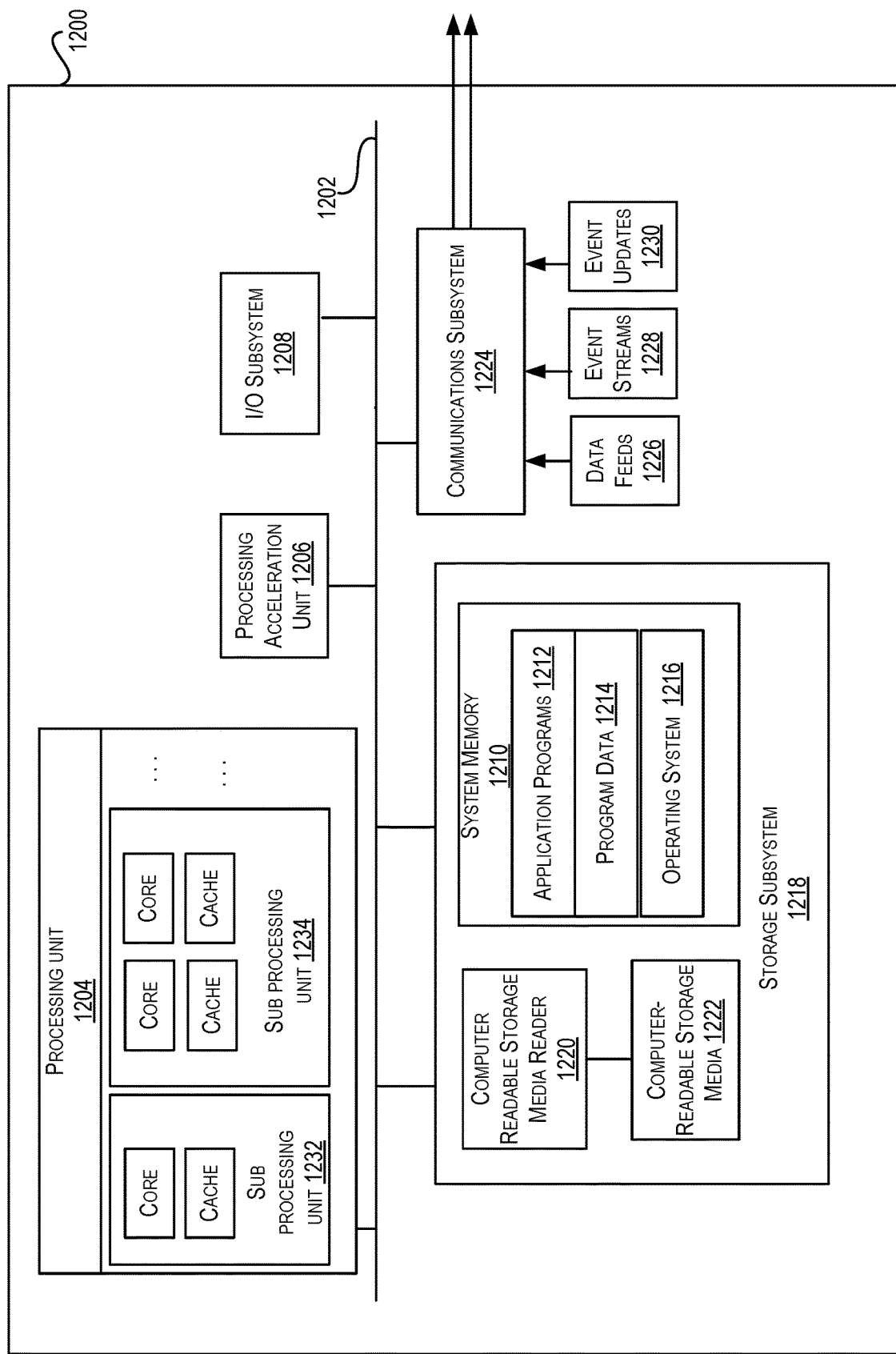
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a first control plane for a first service, a request to create an attachment between a first compute instance of the first service and a second compute instance of a second service, where the first compute instance is controlled by the first control plane, the second compute instance is controlled by a second control plane, the first compute instance is within a customer tenancy, the second compute instance is within the customer tenancy, and the first compute instance is isolated from the second compute instance within the customer tenancy;
   executing, by the first control plane, a set of processing steps to create the attachment between the first compute instance and the second compute instance;
   after executing the set of processing steps and due to the attachment, gaining, by the first control plane, ownership and control of the second compute instance and enabling communication between the first compute instance and the second compute instance, wherein the first compute instance becomes a dominant compute instance, the first control plane becomes a dominant control plane, the second compute instance becomes a passive compute instance, and the second control plane becomes a passive control plane;

receiving, by the dominant control plane, from a user, a request to perform an operation at the passive compute instance, wherein the request is received at the dominant control plane instead of the passive control plane because of the attachment causing the dominant control plane to have ownership of the passive compute instance;

performing a first authorization including:
  identifying, by the dominant control plane, due to the passive compute instance being located at a root compartment of the customer tenancy, a first set of allowed operations associated with the root compartment of the customer tenancy;
  determining, by the dominant control plane, that the first set of allowed operations associated with the root compartment of the customer tenancy indicate that the operation is authorized;

in response to determining that the operation is authorized based on the first set of allowed operations associated with the root compartment of the customer tenancy, and before determining whether to deny or allow the request to perform the operation at the passive compute instance, determining, by the dominant control plane, that the attachment exists between the passive compute instance and the dominant compute instance, and determining to perform additional authorization checks due to the attachment existing;

calling, by the dominant control plane, the passive control plane to request a stored list of allowed customer operations associated with the attachment;

determining, by the dominant control plane, that the operation is restricted and requires dual authorization based upon the stored list of allowed customer operations associated with the attachment;

performing a second authorization including:
  identifying, by the dominant control plane, due to the dominant control plane having ownership of the passive compute instance, a second set of allowed operations associated with a first owner compartment of a dominant tenancy associated with the dominant control plane, the second set of allowed operations being stored in association with the attachment and indicating operations that are permitted on the passive compute instance, wherein the second set of allowed operations associated with the first owner compartment of the dominant tenancy associated with the dominant control plane are identified instead of a third set of allowed operations associated with a second owner compartment of a passive tenancy associated with the passive control plane because of the dominant control plane having ownership of the passive compute instance due to the attachment;
  determining, by the dominant control plane, that the second set of allowed operations associated with the first owner compartment of the dominant tenancy associated with the dominant control plane indicate that the operation is not authorized, and thereby the dual authorization is failed; and in response to determining that the operation is not authorized based on the second set of allowed operations and thereby the dual authorization is failed, denying, by the dominant control plane, the request to perform the operation at the passive compute instance.

2. The method of claim 1, wherein the first service is an Enterprise Resource Planning (ERP) service, and the second service is a conversational Artificial Intelligence (AI) service.

3. The method of claim 1, wherein the operation is a deleting the passive compute instance.

4. The method of claim 1, wherein the operation is not authorized within the second set of allowed operations due to the attachment.

5. The method of claim 1, wherein the first service is an Enterprise Resource Planning (ERP) service, and the second service is a chatbot service.

6. The method of claim 1, wherein the customer tenancy is provided by a cloud computing provider.

7. The method of claim 1, wherein the customer tenancy, the dominant tenancy, and the passive tenancy are provided by an Infrastructure-as-a-Service (IaaS) provider.

8. A non-transitory computer-readable storage medium, storing computer-executable instructions that, when executed, cause one or more processors of a computer system to perform a method comprising:

receiving, by a first control plane for a first service, a request to create an attachment between a first compute instance of the first service and a second compute instance of a second service, where the first compute instance is controlled by the first control plane, the second compute instance is controlled by a second control plane, the first compute instance is within a customer tenancy, the second compute instance is within the customer tenancy, and the first compute instance is isolated from the second compute instance within the customer tenancy;

executing, by the first control plane, a set of processing steps to create the attachment between the first compute instance and the second compute instance;

after executing the set of processing steps and due to the attachment, gaining, by the first control plane, ownership and control of the second compute instance and enabling communication between the first compute instance and the second compute instance, wherein the first compute instance becomes a dominant compute instance, the first control plane becomes a dominant control plane, the second compute instance becomes a passive compute instance, and the second control plane becomes a passive control plane;

receiving, by the dominant control plane, from a user, a request to perform an operation at the passive compute instance, wherein the request is received at the dominant control plane instead of the passive control plane because of the attachment causing the dominant control plane to have ownership of the passive compute instance;

performing a first authorization including:
  identifying, by the dominant control plane, due to the passive compute instance being located at a root compartment of the customer tenancy, a first set of allowed operations associated with the root compartment of the customer tenancy;
  determining, by the dominant control plane, that the first set of allowed operations associated with the root compartment of the customer tenancy indicate that the operation is authorized;

in response to determining that the operation is authorized based on the first set of allowed operations associated with the root compartment of the customer tenancy, and before determining whether to deny or allow the request to perform the operation at the passive compute instance, determining, by the dominant control plane, that the attachment exists between the passive compute instance and the dominant compute instance, and determining to perform additional authorization checks due to the attachment existing;

calling, by the dominant control plane, the passive control plane to request a stored list of allowed customer operations associated with the attachment;

determining, by the dominant control plane, that the operation is restricted and requires dual authorization based upon the stored list of allowed customer operations associated with the attachment;

performing a second authorization including:
  identifying, by the dominant control plane, due to the dominant control plane having ownership of the passive compute instance, a second set of allowed operations associated with a first owner compartment of a dominant tenancy associated with the dominant control plane, the second set of allowed operations being stored in association with the attachment and indicating operations that are permitted on the passive compute instance, wherein the second set of allowed operations associated with the first owner compartment of the dominant tenancy associated with the dominant control plane are identified instead of a third set of allowed operations associated with a second owner compartment of a passive tenancy associated with the passive control plane because of the dominant control plane having ownership of the passive compute instance due to the attachment;
  determining, by the dominant control plane, that the second set of allowed operations associated with the first owner compartment of the dominant tenancy associated with the dominant control plane indicate that the operation is not authorized, and thereby the dual authorization is failed; and in response to determining that the operation is not authorized based on the second set of allowed operations and thereby the dual authorization is failed, denying, by the dominant control plane, the request to perform the operation at the passive compute instance.

9. The non-transitory computer-readable storage medium of claim 8, wherein the operation is a deleting the passive compute instance.

10. The non-transitory computer-readable storage medium of claim 8, wherein the operation is not authorized within the second set of allowed operations due to the attachment.

11. The non-transitory computer-readable storage medium of claim 8, wherein the first service is an Enterprise Resource Planning (ERP) service, and the second service is a chatbot service.

12. The non-transitory computer-readable storage medium of claim 8, wherein the customer tenancy is provided by a cloud computing provider.

13. The non-transitory computer-readable storage medium of claim 8, wherein the customer tenancy, the dominant tenancy, and the passive tenancy are provided by an IaaS provider.

14. A computer system comprising:
a processor; and
a memory configured to store a plurality or instructions executable by the processor and upon execution by the processor to cause processing to be performed comprising:

receiving a request to create an attachment between a first compute instance of a first service and a second compute instance of a second service, where the first compute instance is controlled by a first control plane, the second compute instance is controlled by a second control plane, the first compute instance is within a customer tenancy, the second compute instance is within the customer tenancy, and the first compute instance is isolated from the second compute instance within the customer tenancy;

executing a set of processing steps to create the attachment between the first compute instance and the second compute instance;

after executing the set of processing steps and due to the attachment, gaining ownership and control of the second compute instance and enabling communication between the first compute instance and the second compute instance, wherein the first compute instance becomes a dominant compute instance, the first control plane becomes a dominant control plane, the second compute instance becomes a passive compute instance, and the second control plane becomes a passive control plane;

receiving, from a user, a request to perform an operation at the passive compute instance, wherein the request is received at the dominant control plane instead of the passive control plane because of the attachment causing the dominant control plane to have ownership of the passive compute instance;

performing a first authorization including:
  identifying, due to the passive compute instance being located at a root compartment of the customer tenancy, a first set of allowed operations associated with the root compartment of the customer tenancy;
  determining that the first set of allowed operations associated with the root compartment of the customer tenancy indicate that the operation is authorized;

in response to determining that the operation is authorized based on the first set of allowed operations associated with the root compartment of the customer tenancy, and before determining whether to deny or allow the request to perform the operation at the passive compute instance, determining that the attachment exists between the passive compute instance and the dominant compute instance, and determining to perform additional authorization checks due to the attachment existing;

calling the passive control plane to request a stored list of allowed customer operations associated with the attachment;

determining that the operation is restricted and requires dual authorization based upon the stored list of allowed customer operations associated with the attachment;

performing a second authorization including:
  identifying, due to the dominant control plane having ownership of the passive compute instance, a second set of allowed operations associated with a first owner compartment of a dominant tenancy associated with the dominant control plane, the second set of allowed operations being stored in association with the attachment and indicating operations that are permitted on the passive compute instance, wherein the second set of allowed operations associated with the first owner compartment of the dominant tenancy associated with the dominant control plane are identified instead of a third set of allowed operations associated with a second owner compartment of a passive tenancy associated with the passive control plane because of the dominant control plane having ownership of the passive compute instance due to the attachment;

determining that the second set of allowed operations associated with the first owner compartment of the dominant tenancy associated with the dominant control plane indicate that the operation is not authorized, and thereby the dual authorization is failed; and in response to determining that the operation is not authorized based on the second set of allowed operations and thereby the dual authorization is failed, denying the request to perform the operation at the passive compute instance.

15. The computer system of claim 14, wherein the first service is an Enterprise Resource Planning (ERP) service, and the second service is a conversational Artificial Intelligence (AI) service.

16. The computer system of claim 14, wherein the operation is a deleting the passive compute instance.

17. The computer system of claim 14, wherein the operation is not authorized within the second set of allowed operations due to the attachment.

18. The computer system of claim 14, wherein the first service is an Enterprise Resource Planning (ERP) service, and the second service is a chatbot service.

19. The computer system of claim 14, wherein the customer tenancy is provided by a cloud computing provider.

20. The computer system of claim 14, wherein the customer tenancy, the dominant tenancy, and the passive tenancy are provided by an IaaS provider.

* * * * *